US012083637B2

(12) United States Patent
Barngrover et al.

(10) Patent No.: US 12,083,637 B2
(45) Date of Patent: Sep. 10, 2024

(54) ROBOTIC SHEAR STUD WELDING SYSTEM AND METHOD OF USE THEREOF

(71) Applicant: SteelFab Inc., Charlotte, NC (US)

(72) Inventors: Russell H. Barngrover, Waxhaw, NC (US); Aaron Pearsall, Salisbury, NC (US)

(73) Assignee: STEELFAB INC., Charlotte, NC (US)

( * ) Notice: Subject to any disclaimer, the term of this patent is extended or adjusted under 35 U.S.C. 154(b) by 659 days.

(21) Appl. No.: 17/316,616

(22) Filed: May 10, 2021

(65) Prior Publication Data

US 2022/0355408 A1 Nov. 10, 2022

(51) Int. Cl.
| | |
|---|---|
| *B23K 9/28* | (2006.01) |
| *B23K 9/20* | (2006.01) |
| *B23K 37/02* | (2006.01) |
| *B23K 37/04* | (2006.01) |

(52) U.S. Cl.
CPC .............. *B23K 9/287* (2013.01); *B23K 9/206* (2013.01); *B23K 37/0229* (2013.01); *B23K 37/04* (2013.01)

(58) Field of Classification Search
CPC .... B23K 37/0229; B23K 37/04; B23K 9/206; B23K 9/287
USPC .......................................................... 219/99
See application file for complete search history.

(56) References Cited

U.S. PATENT DOCUMENTS

| | | | |
|---|---|---|---|
| 3,562,484 A | 2/1971 | Murdock | |
| 3,579,260 A | 5/1971 | Logan | |
| 5,130,510 A | 7/1992 | Zeigler et al. | |
| 5,403,988 A | 4/1995 | Kawada et al. | |
| 5,779,609 A | 7/1998 | Cullen et al. | |
| 6,388,224 B1 | 5/2002 | Torvinen | |
| 7,053,332 B2 | 5/2006 | Schmitt | |
| 8,338,738 B2 | 12/2012 | Aoyama et al. | |
| 8,653,402 B2 | 2/2014 | Muller et al. | |
| 10,252,368 B2 | 4/2019 | Benzing et al. | |
| 2012/0103957 A1 | 5/2012 | Powers | |
| 2015/0183046 A1 | 7/2015 | Kim | |
| 2019/0201998 A1* | 7/2019 | Benzing | B23K 9/20 |

FOREIGN PATENT DOCUMENTS

KR 10-1667495 B1 * 10/2016 ............. B23K 37/02

* cited by examiner

*Primary Examiner* — Dana Ross
*Assistant Examiner* — James F Sims, III
(74) *Attorney, Agent, or Firm* — Jeffrey C. Watson, Esq.; Grell & Watson Patent Attorneys LLC

(57) ABSTRACT

A robotic shear stud welding system includes a stud feeder, a ferrule feeder, at least one work zone, a robot, and a welding gun. The stud feeder is configured to hold a plurality of studs and feed a single stud therefrom. The ferrule feeder is configured to hold a plurality of ferrules and feed a single ferrule therefrom. The robot has a controllable arm that is configured to accurately move between the stud feeder, the ferrule feeder, and each of the at least one work zones. The welding gun is attached to the distal end of the controllable arm. The welding gun is configured to pick up the single stud from the stud feeder, pick up the single ferrule from the ferrule feeder and position the single ferrule at a bottom of the single stud, and shoot the single stud to a workpiece in one of the at least one work zones.

19 Claims, 23 Drawing Sheets

ROBOTIC SHEAR STUD WELDING SYSTEM AND METHOD OF USE THEREOF

FIELD OF THE DISCLOSURE

The present disclosure is directed to shear stud welding, like Nelson shear stud welding. More specifically, the present disclosure is directed to a robotic shear stud welding system and method of use thereof.

BACKGROUND

Generally speaking, stud welding is a technique similar to flash welding where a fastener or specially formed nut is welded onto another metal part, typically a base metal or substrate, like a beam. The fastener can take different forms, but typically fall under threaded, unthreaded, or tapped. The bolts may be automatically fed into the stud welder. Weld nuts generally have a flange with small nubs that melt to form the weld. Weld studs are used in stud welding systems. Manufacturers create weld studs for the two main forms of stud welding capacitor discharge stud welding and drawn arc stud welding.

Drawn arc stud welding joins a stud and another piece of metal together by heating both parts with an arc. The stud is usually joined to a flat plate by using the stud as one of the electrodes. The polarity used in stud welding depends on the type of metal being used. Welding aluminum, for example, would usually require direct-current electrode positive (DCEP). Welding steel would require direct-current electrode negative (DCEN).

Stud welding uses a flux tip and a ferrule, a ceramic ring which concentrates the heat, prevents oxidation and retains the molten metal in the weld zone. The ferrule is broken off of the fastener after the weld is completed. This lack of marring on the side opposite the fastener is what differentiates stud welding from other fastening processes. Drawn arc studs range from a #8 to 1¼" diameter. The lengths are variable from ⅜" to 60" (for deformed bars). Arc studs are typically loaded with an aluminum flux ball on the weld end which aids in the welding process. Drawn arc weld studs are commonly made from mild steel and stainless steel.

Electric-Arc stud welding is the most common process and is utilized whenever metal is fabricated. It is used to best advantage when the base plate is heavy enough to support the full strength of the welded studs but is sometimes used with lighter gauge material. The Stud is held in the welding gun with the end of the stud placed against the work. The cycle is started by depressing the trigger button start switch. The stud is then automatically retracted from the work piece to establish an arc. The arc continues for predetermined period of time until portions of the stud and the base plate have been melted. Then, the welding gun automatically plunges the stud into the molten pool of metal and holds it there under spring pressure. At the same time, the welding current is stopped and, when the molten metal solidifies, the weld is completed, and the welding gun is removed from the stud. The molten metal is held in place by a ceramic ferrule which also serves to shield the arc. The weld metal is deoxidized by a flux in the weld end of the stud. This results in a dense, strong weld which will develop the full strength of the stud and base plate. The weld cycle depends on the diameter of the fastener and materials being joined and varies in time from 1/10 to 1½ seconds. Welding currents range from 250 to 3000 amps.

The most common stud welding systems includes an arc unit connected with an arc gun that can be moved around in proximity to the arc unit. As an example, and clearly not limited thereto, such stud welding systems include the Nelson stud welding system as provided by Nelson Products of New Zealand or Stanley Engineered Fastening of Stanfield, NC. Nelson is the world's leading producer of stud welding fasteners and equipment. Nelson invented the stud welding process and has spread its acceptance to a wide variety of end users. Fastening with the Nelson system is quick, reliable and economical. It is a proven and tested method that successfully meets stringent fastening, material and welding codes. It has received approvals from recognized design agencies, code bodies and industrial standard organizations.

However, the instant disclosure recognizes the difficulties or manual labor required with using such stud welding systems. A lot of jobs that require stud welding, like shear studs on beams or the like, require a large number of studs to be welded. With the current stud welding systems, each of these studs must be manually welded with the arc gun which takes time and labor. Especially when you consider that these arc guns used for stud welding can be bulky and heavy, thereby, fatiguing the operator after a number of uses. This leads to the operator taking breaks or moving slowly through the process. Therefor, there is clearly a need to provide an easier, faster, less labor intensive system and/or method for stud welding.

The instant disclosure may be designed to address at least certain aspects of the problems or needs discussed above by providing a robotic shear stud system and method of use thereof.

SUMMARY

The present disclosure may solve the aforementioned limitations of the currently available shear stud welding devices and methods, by providing the disclosed robotic shear stud welding system and method of use thereof. Accordingly, in one aspect, the present disclosure embraces a robotic shear stud welding system that may generally include a stud feeder, a ferrule feeder, at least one work zone, a robot, and a welding gun. The stud feeder may be configured to hold a plurality of studs and feed a single stud therefrom. The ferrule feeder may be configured to hold a plurality of ferrules and feed a single ferrule therefrom. The robot may have a controllable arm that is configured to accurately move between the stud feeder, the ferrule feeder, and each of the at least one work zones. The welding gun may be attached to the distal end of the controllable arm. The welding gun attached to the distal end of the controllable arm of the robot may be configured to pick up the single stud from the stud feeder, pick up the single ferrule from the ferrule feeder and position the ferrule at a bottom of the stud, and shoot the stud to a workpiece in one of the at least one work zones.

One feature of the disclosed robotic shear stud welding system may be the inclusion of a ferrule gripper. The ferrule gripper may be configured to grip the ferrule and position the ferrule at the bottom of the stud. In select embodiments, the ferrule gripper may include a first side and a second side. The first side may have a first arm. The second side may have a second arm. Wherein, the ferrule gripper may be configured to open the first side from the second side by moving the first arm away from the second arm, and the ferrule gripper is configured to close by moving the first arm toward the second arm. Wherein, when the ferrule gripper is closed a top chamber is created at a top portion of the ferrule gripper between the first side and the second side and a bottom chamber is created at a bottom portion of the ferrule gripper between the first side and the second side. The top chamber may be configured to fit around the stud. The bottom chamber may be configured to grip the ferrule and position the ferrule at the bottom of the stud.

In select embodiments of the disclosed robotic shear stud welding system, the welding gun on the controllable arm may be a drawn arc welding gun, like a Nelson gun provided by Nelson Products of New Zealand or Stanley Engineered Fastening of Stanfield, NC.

In select embodiments, the robotic shear stud welding system may include at least two of the work zones. The at least two work zones may include a first work zone, and a second work zone. Wherein, the robotic shear stud welding system may be configured to operate exclusively in the first work zone while the second work zone is being prepared, or work exclusively in the second work zone while the first work zone is being prepared. In select embodiments, the first work zone may include a first safety light curtain. The first safety light curtain may be activated when the controllable arm is shooting studs in the first work zone and deactivated when the controllable arm is not shooting studs in the first work zone, whereby, the first work zone can be prepared. Likewise, the second work zone may include a second safety light curtain. The second safety light curtain may be activated when the controllable arm is shooting studs in the second work zone and deactivated when the controllable arm is not shooting studs in the second work zone, whereby, the second work zone can be prepared.

Another feature of the disclosed robotic shear stud welding system may be that each of the at least one work zones may include an electro magnet. The electro magnet may be under the associated work zone. The electro magnet may be configured to be energized to hold the workpiece down after the welding gun shoots the stud on the workpiece and while the welding gun moves away from the stud.

Another feature of the disclosed robotic shear stud welding system may be that the stud feeder can include an automated stud bowl feeder. The automated stud bowl feeder may be configured to hold the plurality of studs and feed the plurality of studs to the stud feeder.

Another feature of the disclosed robotic shear stud welding system may be that the ferrule feeder can include an automated ferrule bowl feeder. The automated ferrule bowl feeder may be configured to hold the plurality of ferrule and feed the plurality of ferrules to the ferrule feeder.

Another feature of disclosed robotic shear stud welding system may be the inclusion of a control panel. The control panel may be configured to control the robotic shear stud welding system, including, but not limited to, controlling the controllable arm of the robot, the welding gun, the stud feeder, the ferrule feeder, and the work zone, like the electro magnet of the work zone. In select embodiments, the control panel may include a user input device with a touch screen configured to allow a user to configure the shear stud welding system. Wherein, in select embodiments, the user input device may include: a plate size selection configured to select the size plate of the workpiece; a plate thickness selection configured to select the thickness of the workpiece; a stud pattern selection configured to select the pattern of the studs to be shot; and/or a stud length selection configured to select the length of the stud. In other select embodiments, the user input device may include a home screen. The home screen may be configured to display the selected plate size, plate thickness, stud pattern, and stud length. The home screen may also be configured to provide selections for: stopping robot; aborting robot; fault reset robot; cycle start robot; and ready to weld for each of the work zones.

Another feature of the disclosed robotic shear stud welding system may be the inclusion of a safety perimeter around the robotic shear stud welding system. In select embodiments, the safety perimeter may include an opening for each of the at least one work zones and the control panel. In addition, at least one access door may be included that are configured for accessing the robot, the ferrule feeder, and/or the stud feeder. In select embodiments, the safety perimeter may include a first access door and a second access door. The first access door may be configured for accessing the ferrule feeder and the stud feeder. The second access door may be configured for accessing the robot.

In another aspect, the instant disclosure embraces a ferrule gripper for a shear stud welding gun. The ferrule gripper may be used on any shear stud welding gun, including, but not limited to, the shear stud welding gun used in the disclosed robotic shear stud welding system. The ferrule gripper may be provided in any of the embodiments and/or combination of embodiments shown and/or described herein. In general, the ferrule gripper may include a first side and a second side. The ferrule gripper may be configured to open and close the first side from the second side. Wherein, when the ferrule gripper is closed a top chamber is created at a top portion of the ferrule gripper between the first side and the second side and a bottom chamber is created at a bottom portion of the ferrule gripper between the first side and the second side. The top chamber may be configured to fit around the stud. The bottom chamber may be configured to grip the ferrule and position the ferrule at the bottom of the stud.

In select embodiments of the disclosed ferrule gripper, the first side may include a first arm, and the second side may include a second arm. Wherein, the ferrule gripper may be configured to open the first side from the second side by moving the first arm away from the second arm. In the opposite, the ferrule gripper may be configured to close by moving the first arm toward the second arm.

In another aspect, the instant disclosure embraces an automated method of shooting a shear stud. The automated method of shooting a shear stud may include utilizing the robotic shear stud welding system in any of the embodiments and/or combination of embodiments shown and/or described herein. As such, the disclosed automated method of shooting a shear stud may generally include providing the disclosed robotic shear stud welding system including a stud feeder, a ferrule feeder, at least one work zone, a robot, and a welding gun. The stud feeder may be configured to hold a plurality of studs and feed a single stud therefrom. The ferrule feeder may be configured to hold a plurality of ferrules and feed a single ferrule therefrom. The robot may have a controllable arm that is configured to accurately move between the stud feeder, the ferrule feeder, and each of the at least one work zones. The welding gun may be attached to the distal end of the controllable arm. Wherein, with the provided robotic shear stud welding system, the disclosed automated method of shooting a shear stud may include the steps of: picking up the single stud from the stud feeder with the welding gun; picking up the single ferrule from the ferrule feeder with the welding gun; positioning the ferrule at a bottom of the stud with the welding gun; and shooting the stud to a workpiece in one of the at least one work zones.

In select embodiments of the disclosed automated method of shooting a shear stud, the welding gun may include a ferrule gripper configured to grip the ferrule and position the ferrule at the bottom of the stud. With this included ferrule gripper, the step of picking up the single stud from the stud feeder with the welding gun may include using the ferrule gripper on the welding gun to pick up the single stud. In addition, the step of picking up the single ferrule from the ferrule feeder with the welding gun may include using the ferrule gripper on the welding gun to pick up the single stud. And finally, the step of positioning the ferrule at a bottom of the stud with the welding gun may include using the ferrule gripper on the welding gun to position the ferrule at the bottom of the stud.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which:

FIG. 9A shows the robotic arm in a starting position without a stud or ferrule loaded. FIG. 9B shows the robotic arm about to pick up a stud from the stud feeder. FIG. 9C shows the robotic arm picking up the stud from the stud feeder. FIG. 9D shows the robotic arm about to pick up a ferrule from the ferrule feeder with the ferrule gripper open. FIG. 9E shows the robotic arm picking up a ferrule from the ferrule feeder via the ferrule gripper closing on the ferrule. FIG. 9F shows the robotic arm placing and welding the stud with ferrule onto the workpiece. And FIG. 9G shows the robotic arm moving away from the welded stud;

FIG. 11A shows the home screen (also noted as "MAIN") for the user input device according to select embodiments. FIG. 11B shows the user input device providing the 3 variable selections of the plate size, the plate thickness and the stud length. FIG. 11C shows the various plate size selections according to select embodiments. FIG. 11D shows the various plate thickness selections according to select embodiments. FIG. 11E shows the various stud pattern selections according to select embodiments. And FIG. 11F shows the various stud length selections according to select embodiments.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-12, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Figure 12:
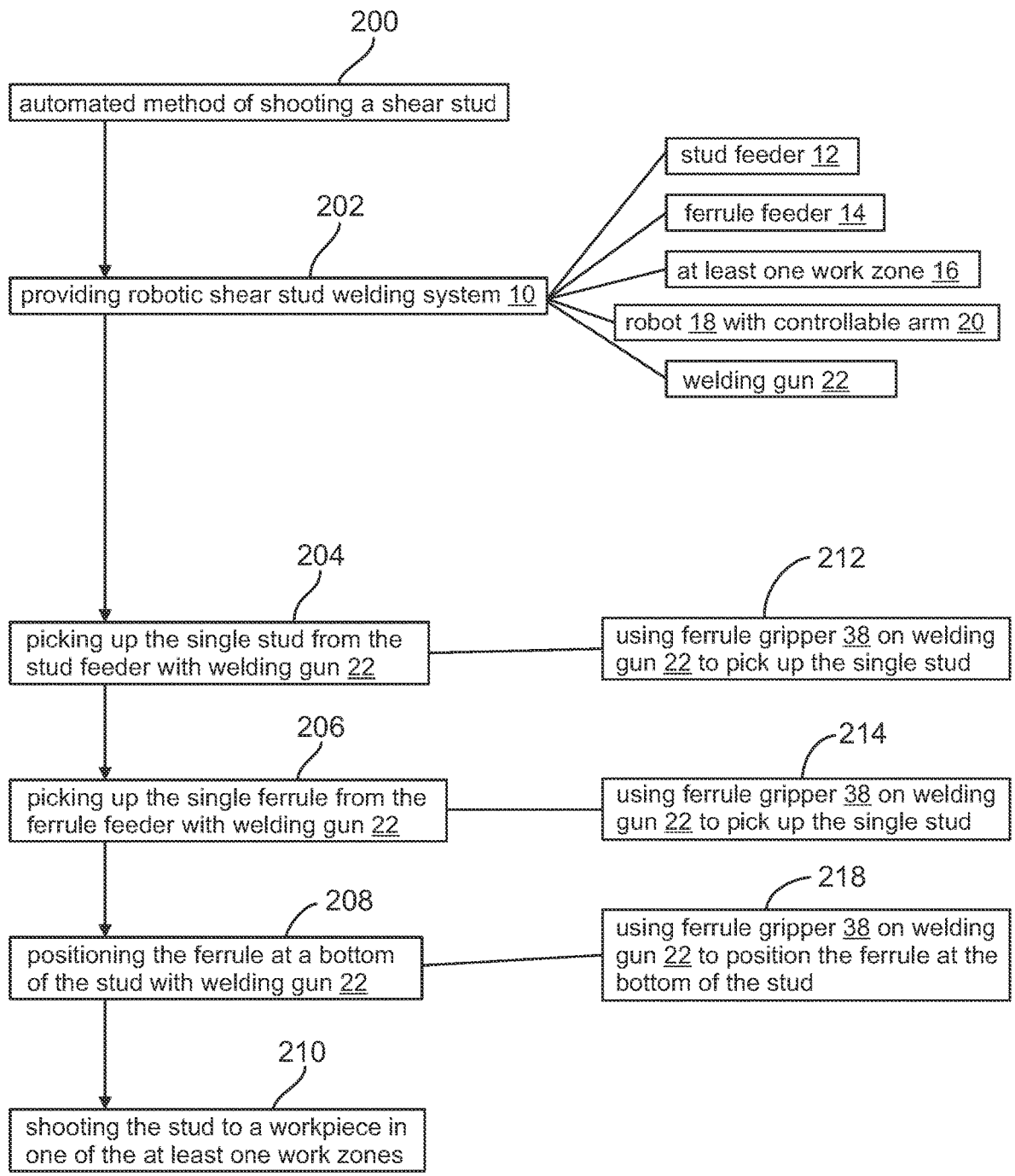
FIG. 12 is a flow chart of the automated method of shooting a shear stud according to select embodiments of the instant disclosure.

The present disclosure solves the aforementioned limitations of the currently available shear stud welding devices and methods, by providing robotic shear stud welding system 10 (see FIGS. 1-11) and method 200 of use thereof (see FIG. 12).

Accordingly, in one aspect, the present disclosure embraces robotic shear stud welding system 10 that may generally include stud feeder 12, ferrule feeder 14, at least one work zone 16, robot 18, and welding gun 22. Stud feeder 12 may be configured to hold a plurality of studs 26 and feed a single stud 28 therefrom. Ferrule feeder 14 may be configured to hold a plurality of ferrules 30 and feed a single ferrule 32 therefrom. Robot 18 may have controllable arm 20 that is configured to accurately move between stud feeder 12, ferrule feeder 14, and each of the at least one work zones 16. Welding gun 22 may be attached to distal end 24 of controllable arm 20. Welding gun 22 attached to distal end 24 of controllable arm 20 of he robot 18 may be configured to pick up single stud 28 from stud feeder 12, pick up single ferrule 32 from ferrule feeder 14 and position single ferrule 32 at bottom 34 of single stud 28, and shoot single stud 28 to workpiece 36 in one of the at least one work zones 16.

Figure 1:
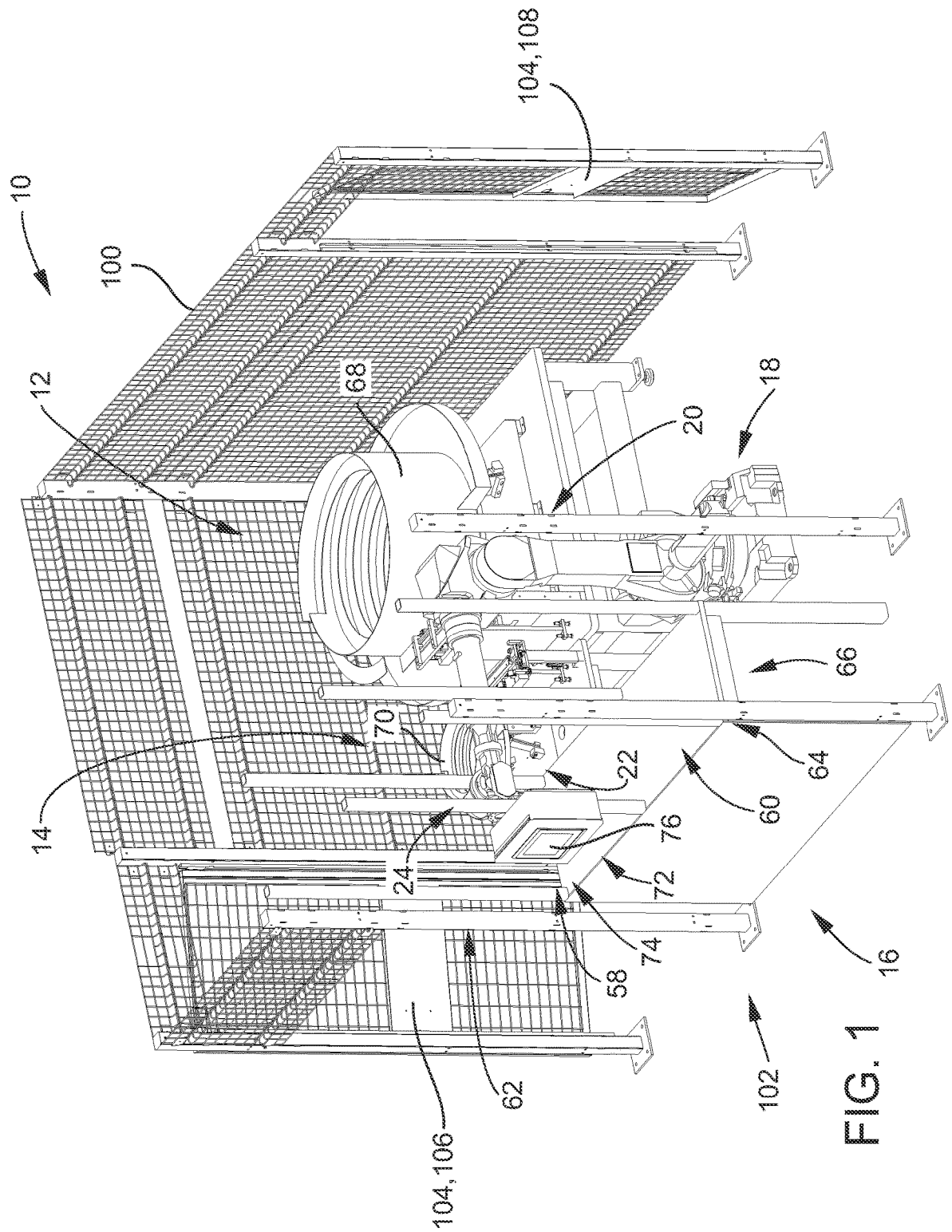
FIG. 1 is a perspective view of the disclosed robotic shear stud welding system according to select embodiments of the instant disclosure.
Figure 2:
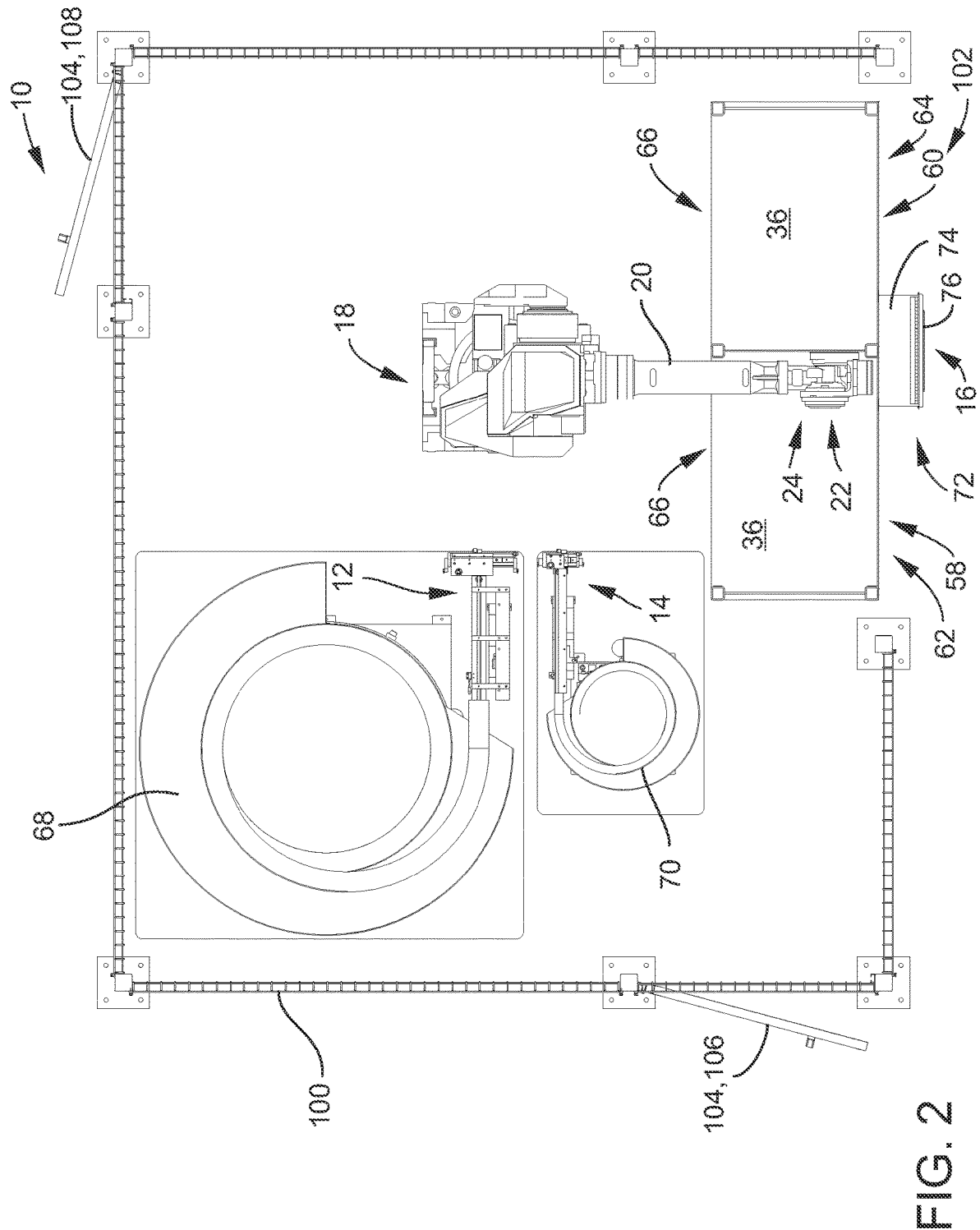
FIG. 2 is a top view of the robotic shear stud welding system of FIG. 1.
Figure 3:
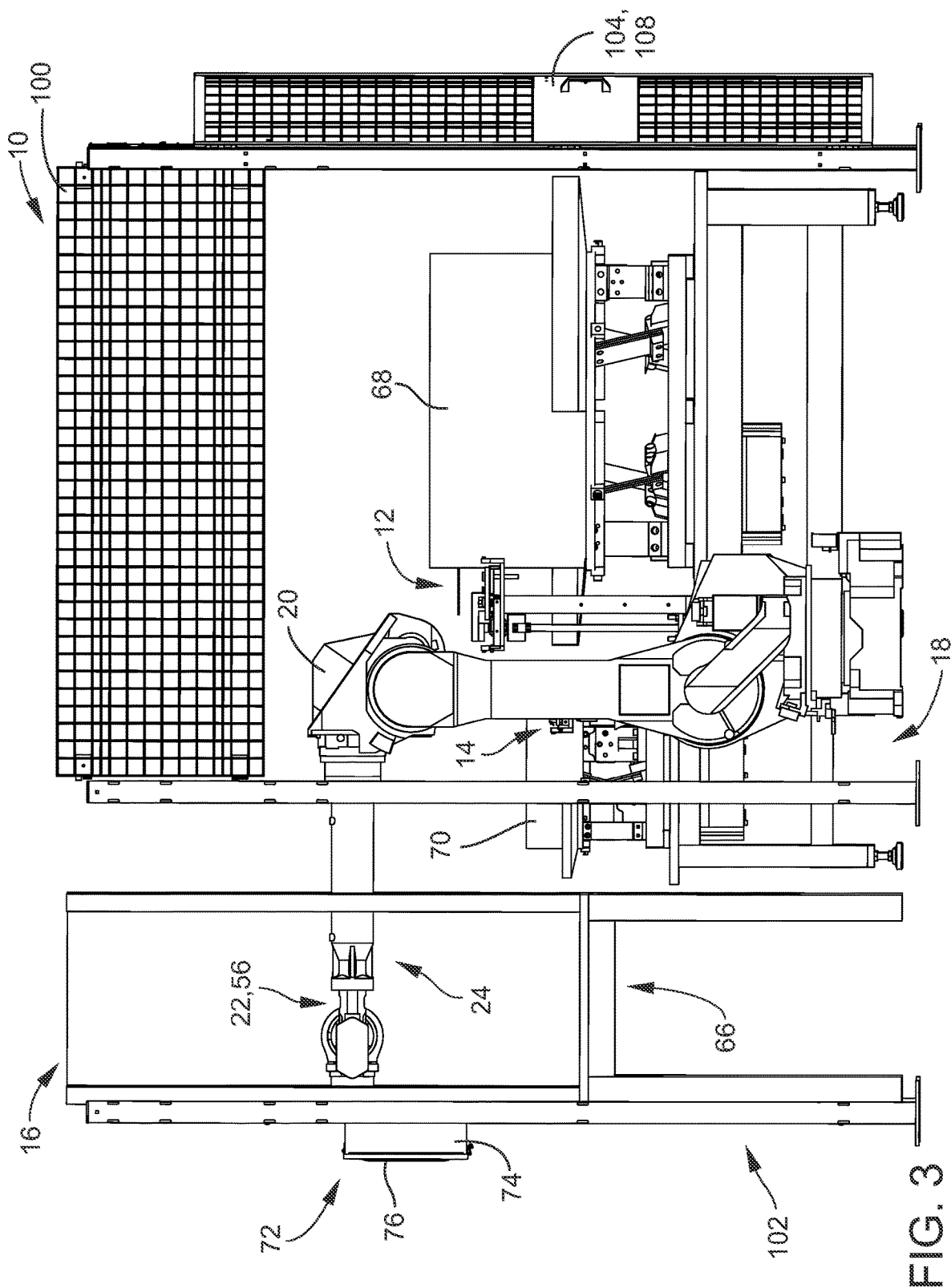
FIG. 3 is a right side view of the robotic shear stud welding system of FIG. 1.
Figure 4:
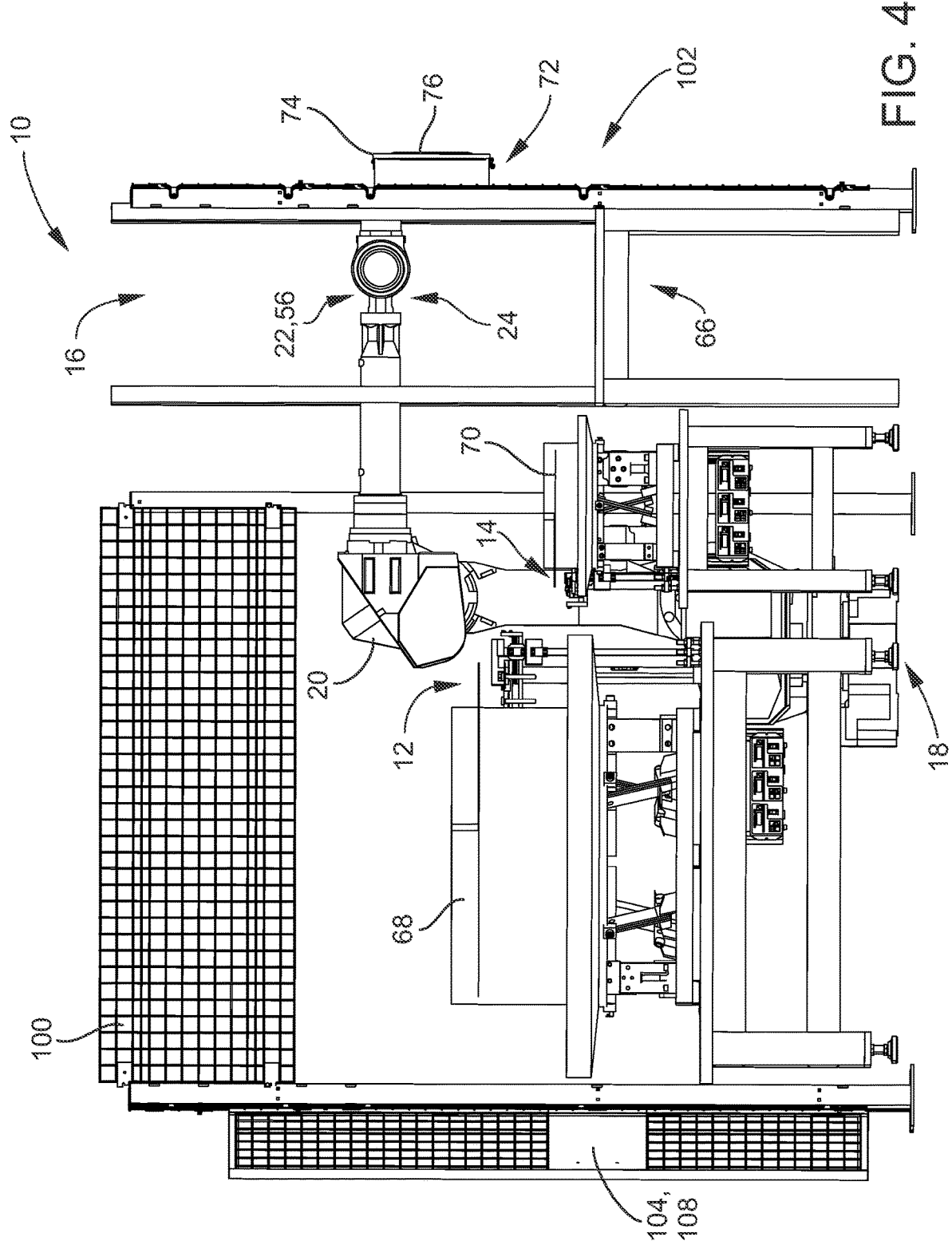
FIG. 4 is a left side view of the robotic shear stud welding system of FIG. 1.
Figure 5:
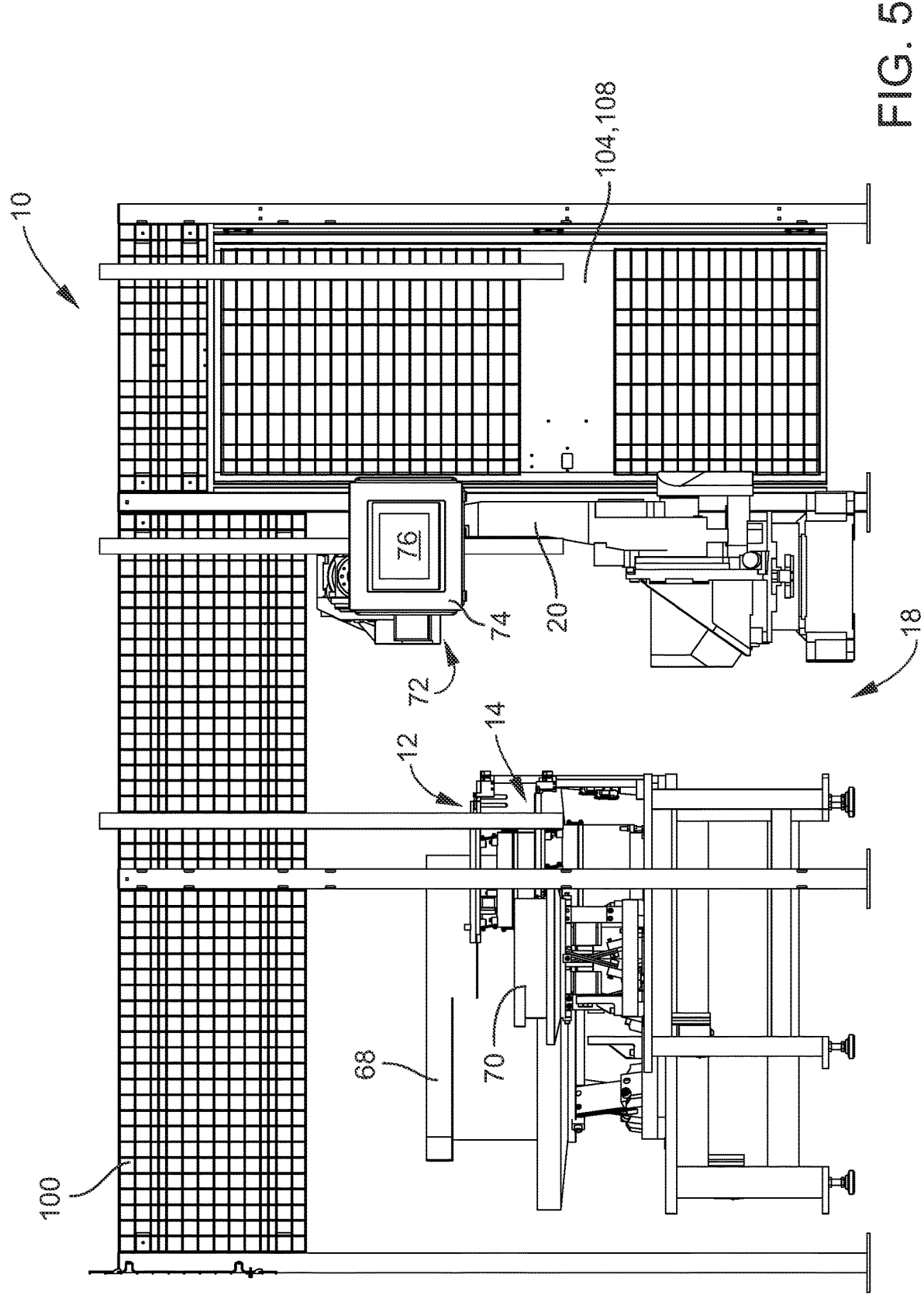
FIG. 5 is a front view of the robotic shear stud welding system of FIG. 1.
Figure 6:
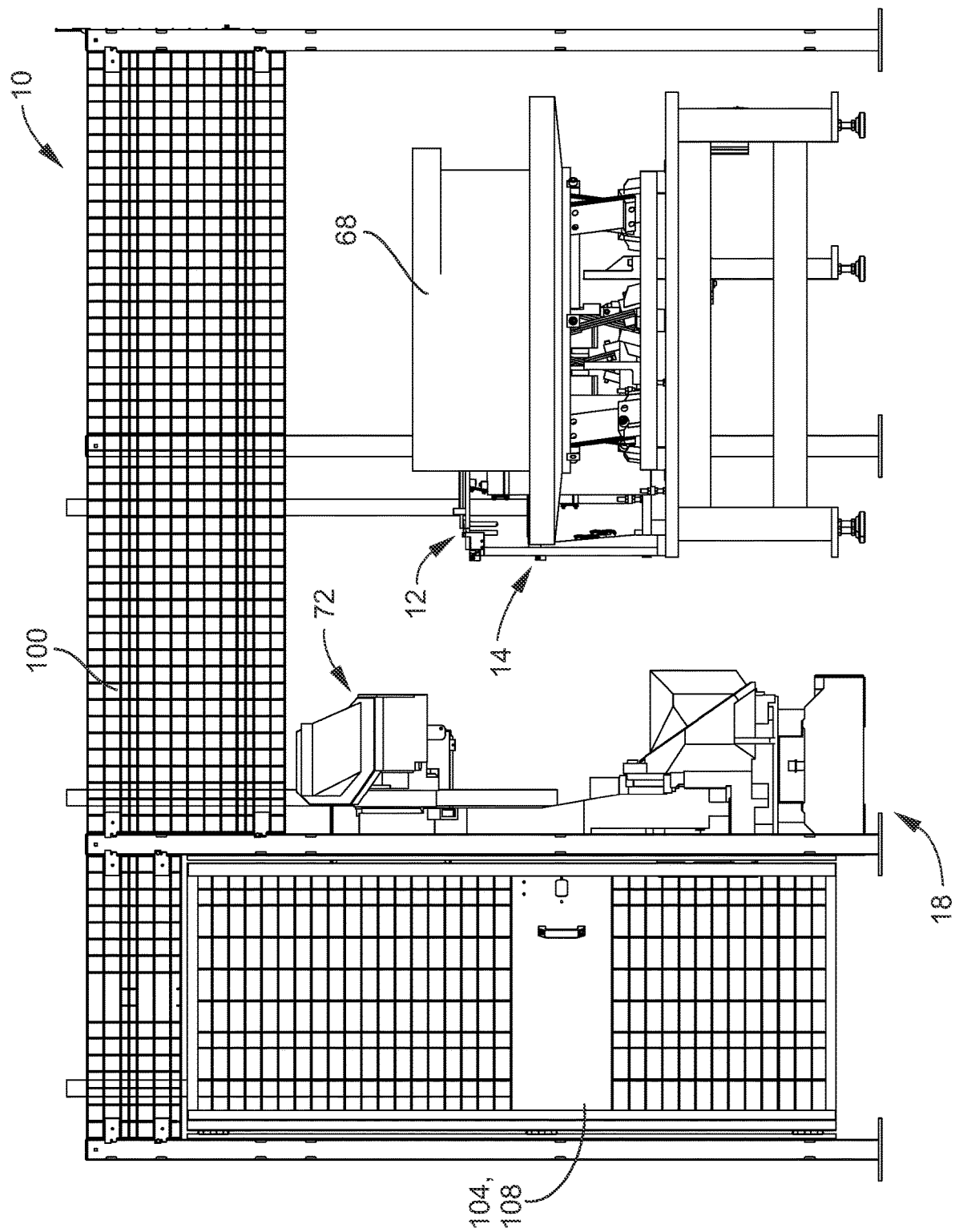
FIG. 6 is a back view of the robotic shear stud welding system of FIG. 1.
Figure 7:
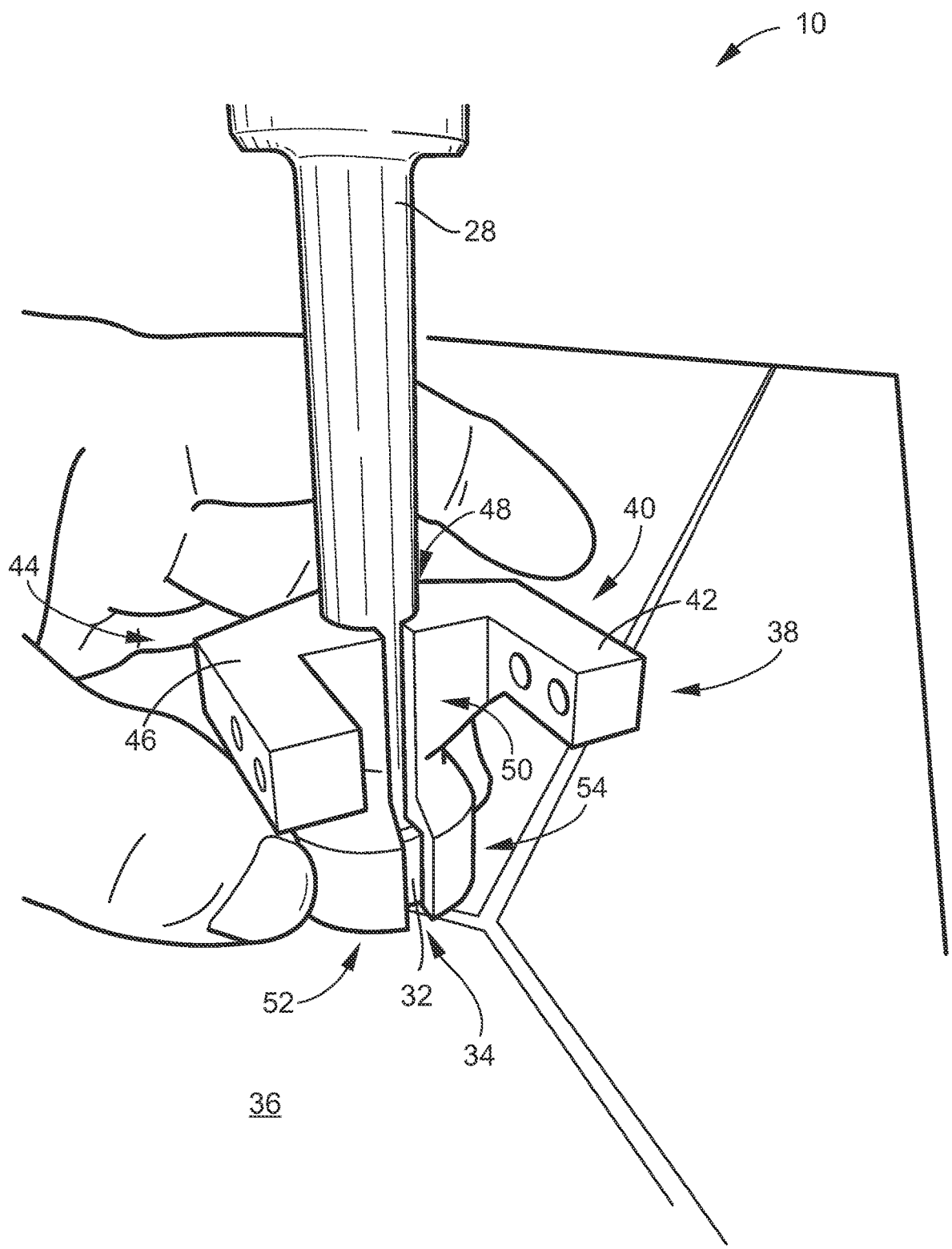
FIG. 7 is a perspective view of the ferrule gripper for the welding gun of the robotic shear stud welding system according to select embodiments of the instant disclosure.
Figure 8:
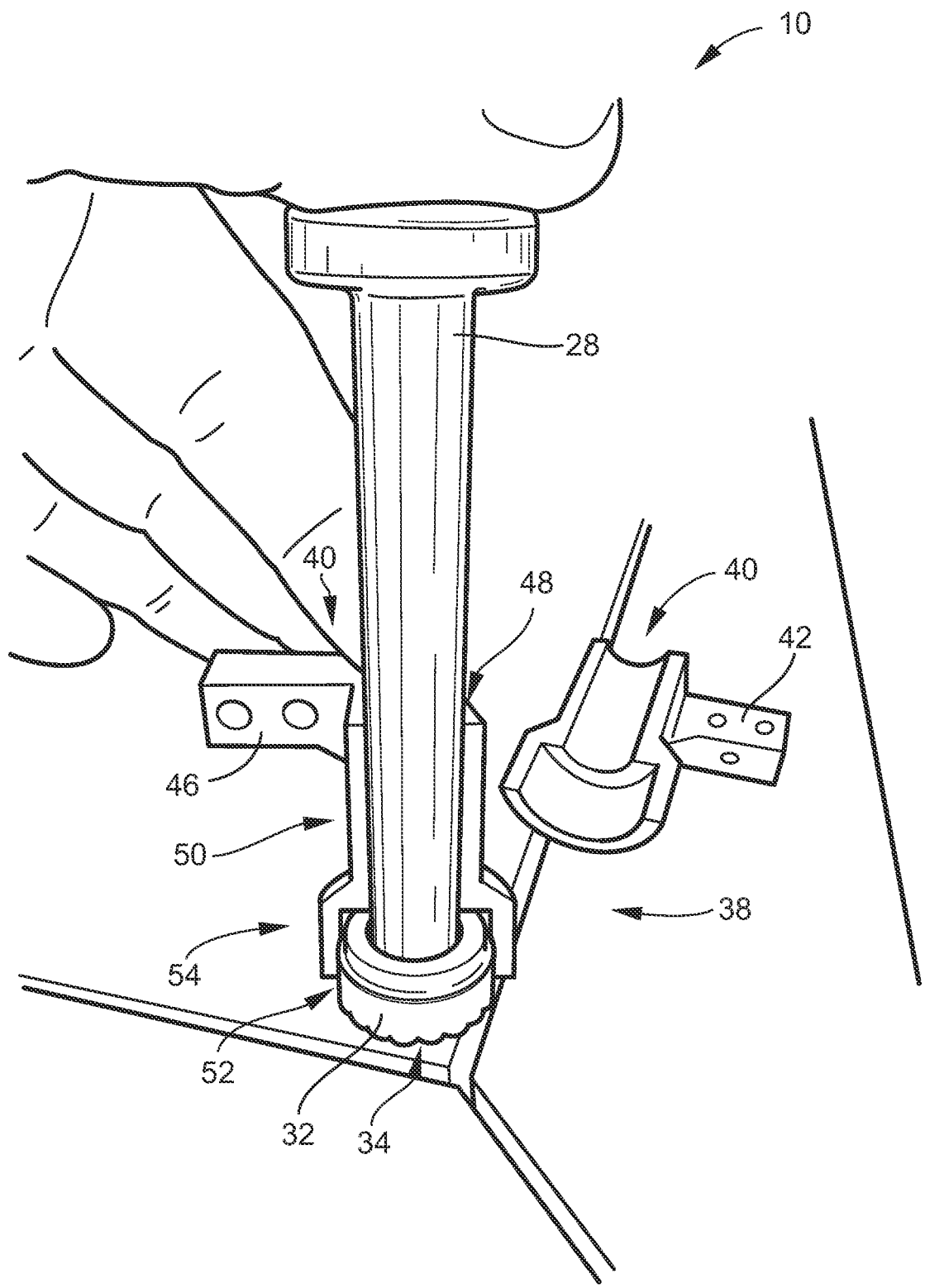
FIG. 8 is a perspective view of the ferrule gripper for welding gun of the robotic shear stud welding system according to select embodiments of the instant disclosure with the ferrule gripper partially disassembled.
Figure 9A:
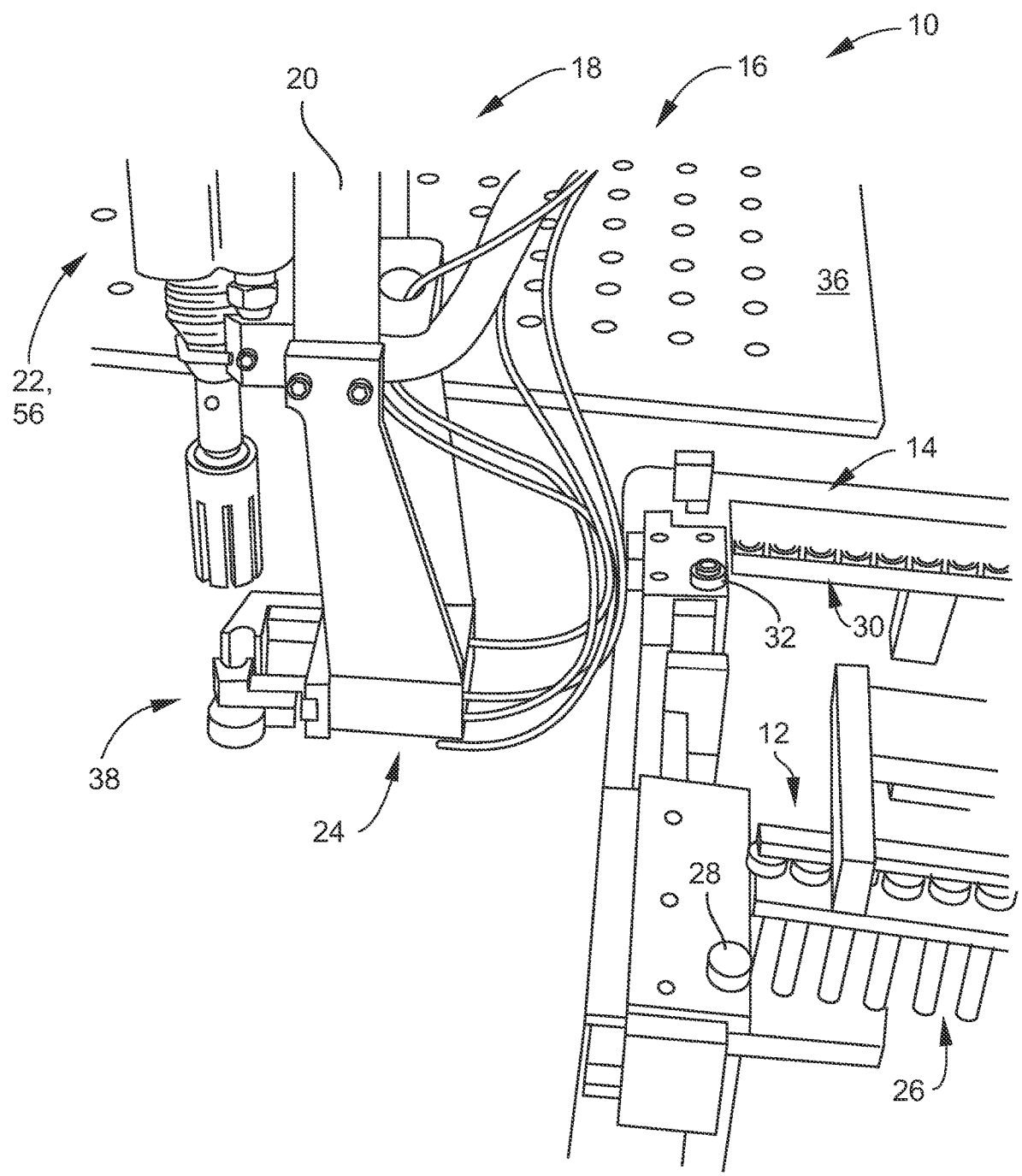
FIGS. 9A-9G show sequential perspective views of the robotic arm of the robotic shear stud welding system moving through the stud welding process according to select embodiments of the instant disclosure.
Figure 9B:
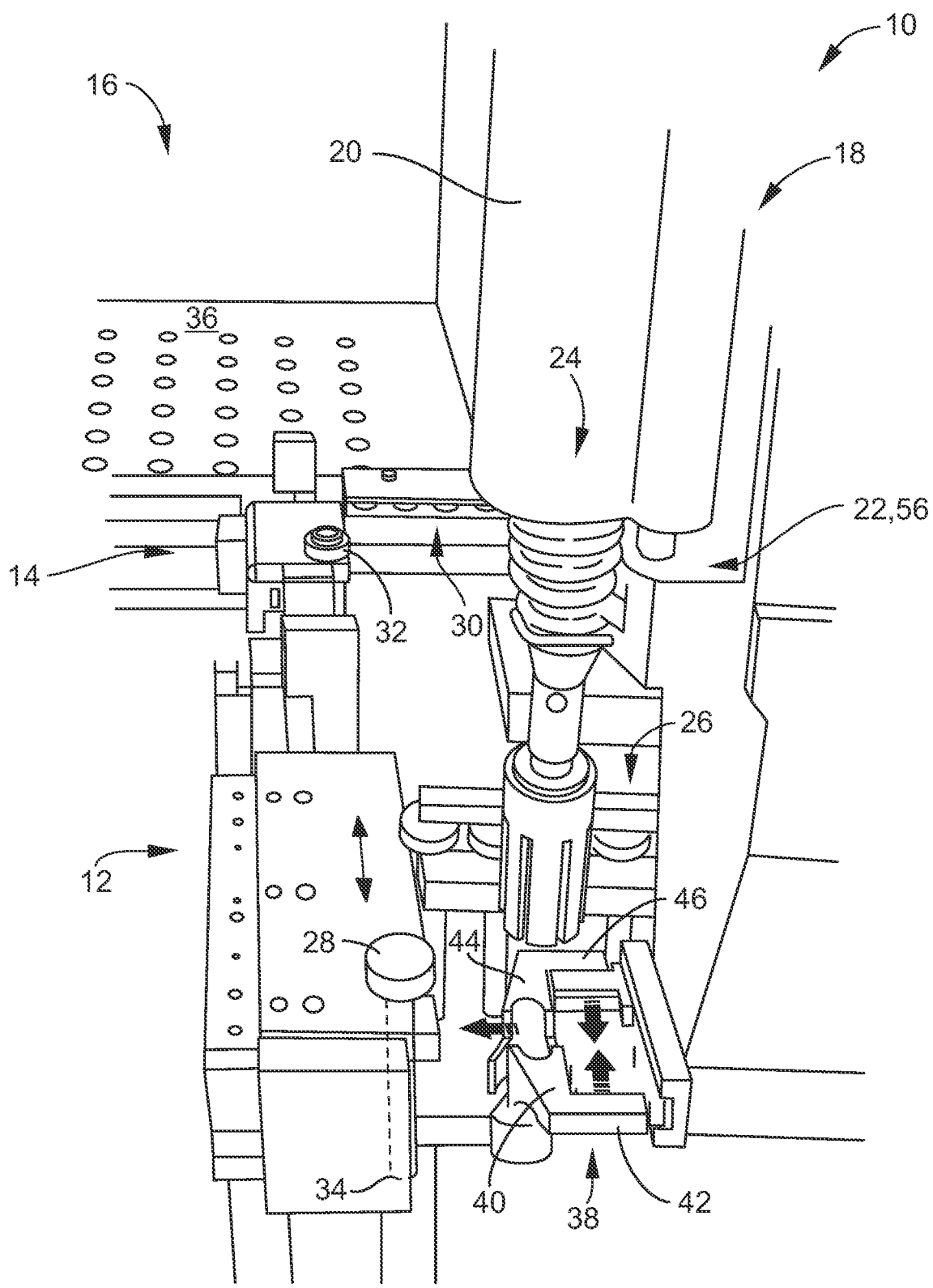
Figure 9C:
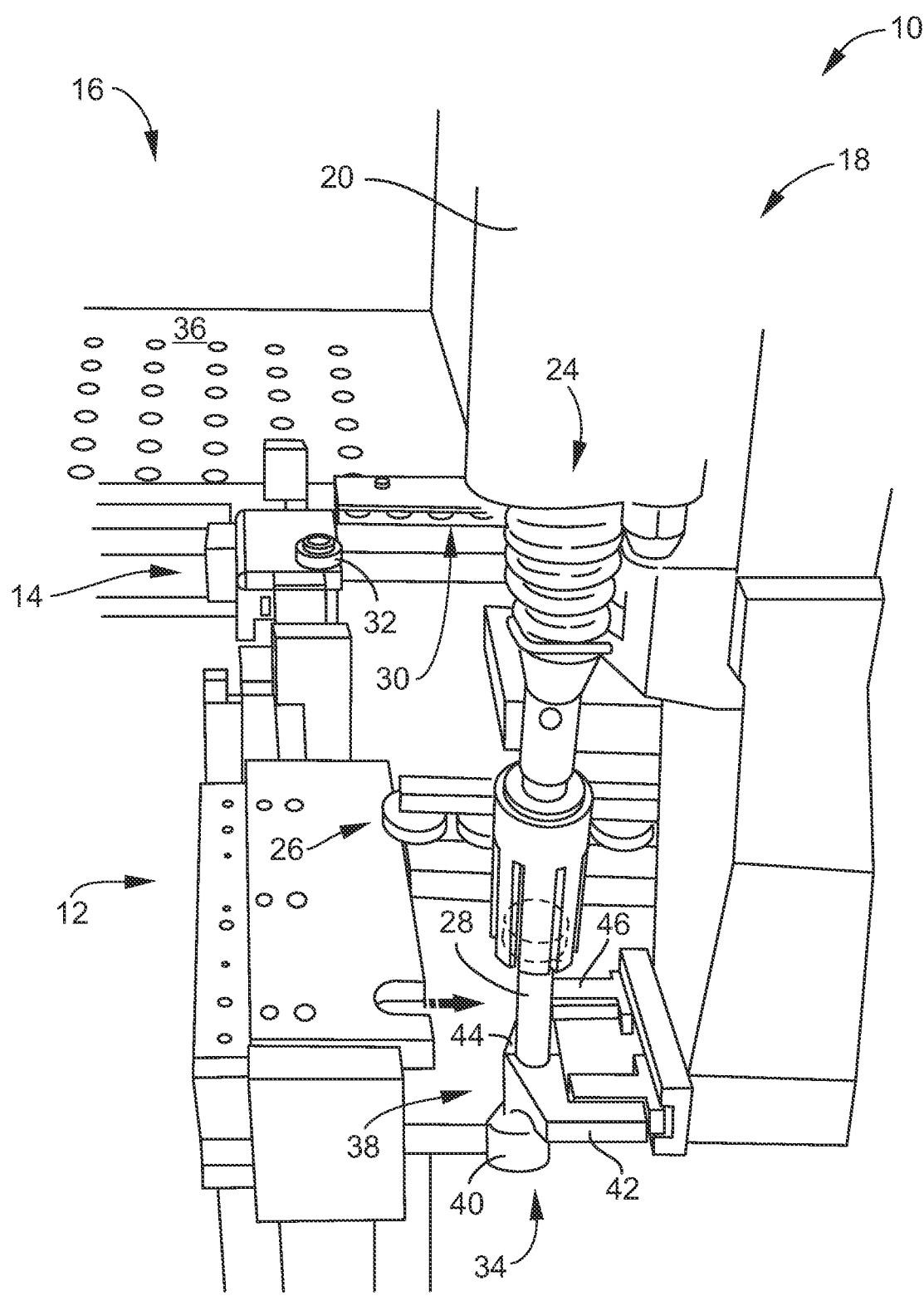
Figure 9D:
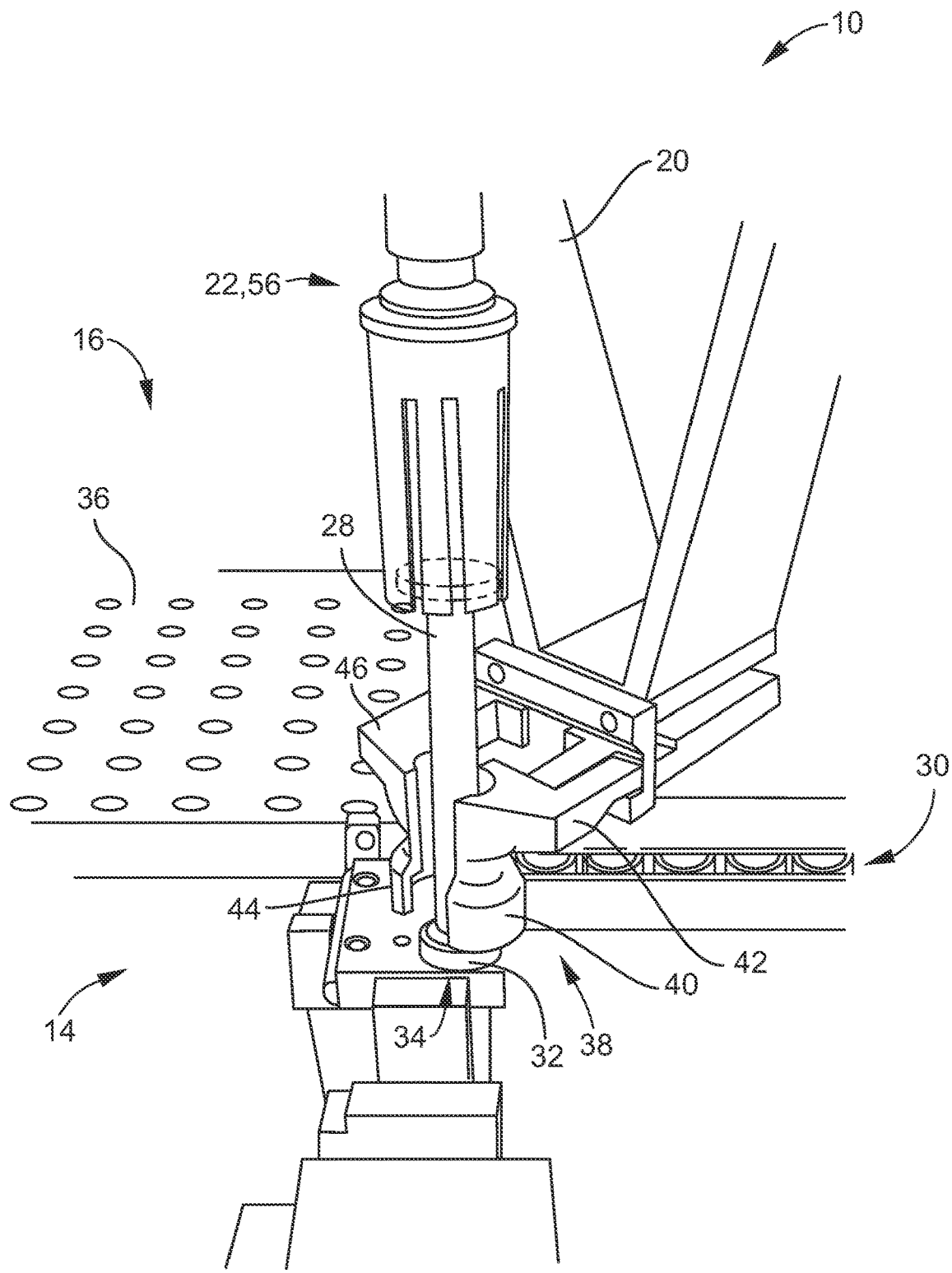
Figure 9E:
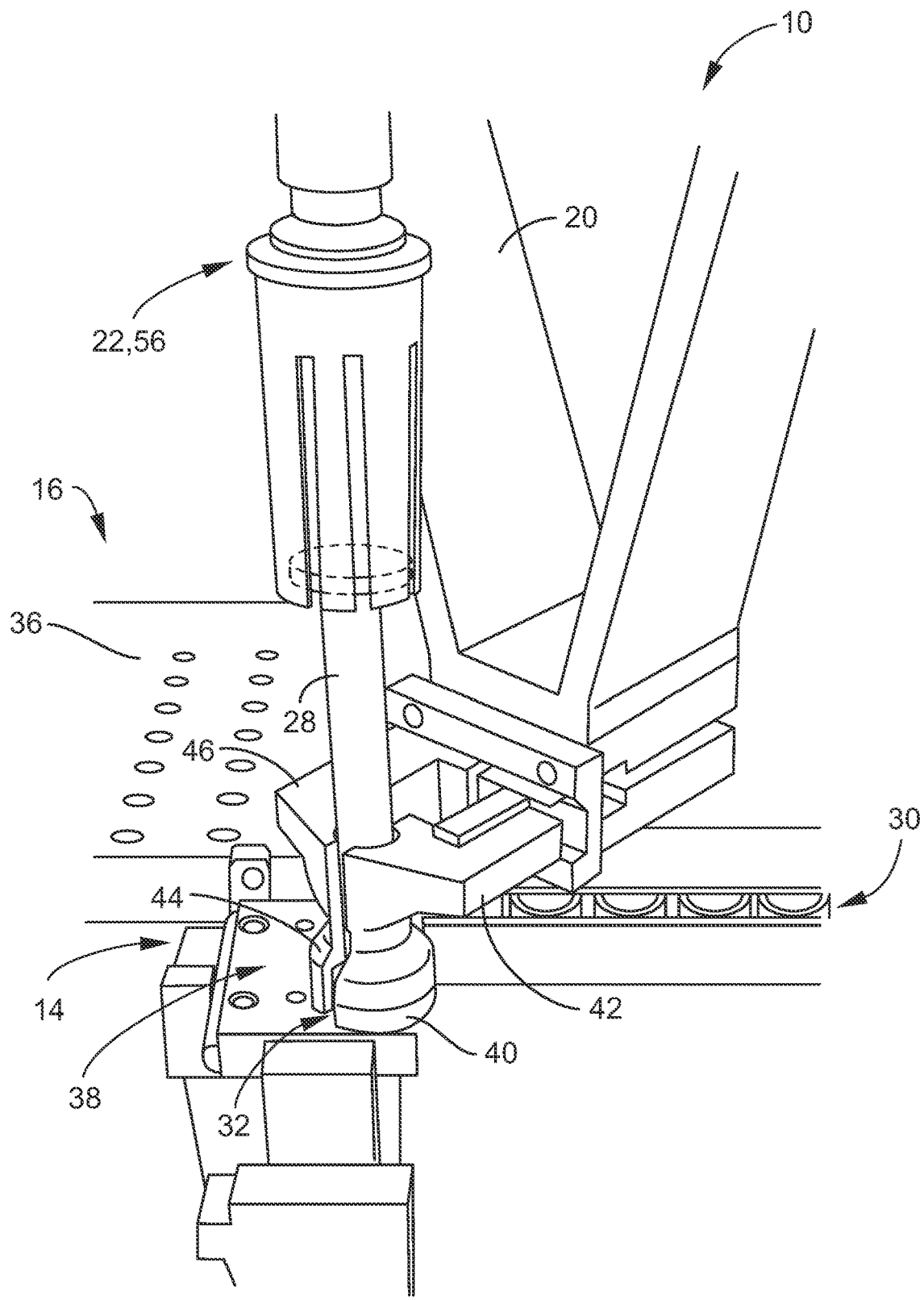
Figure 9F:
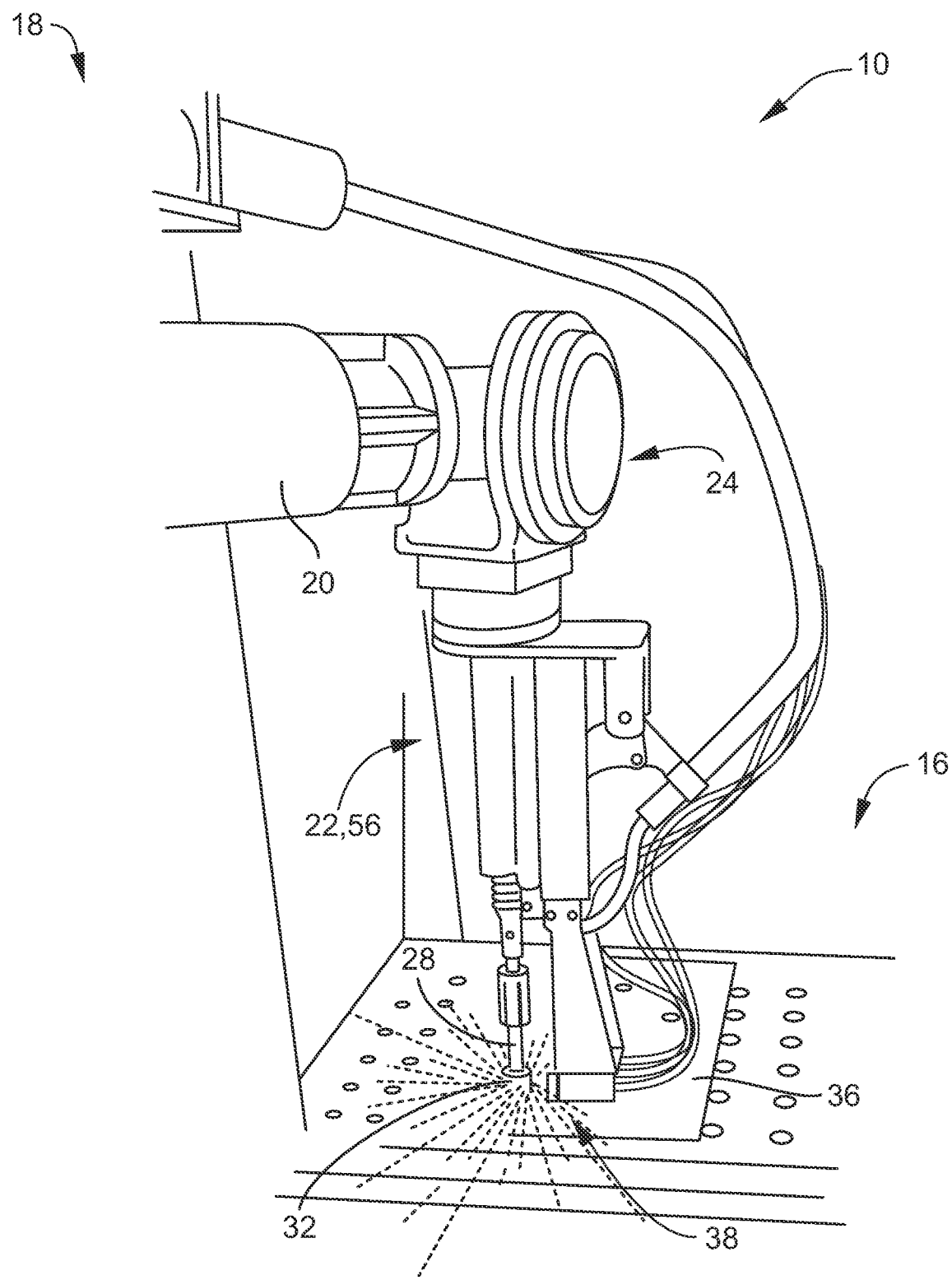
Figure 9G:
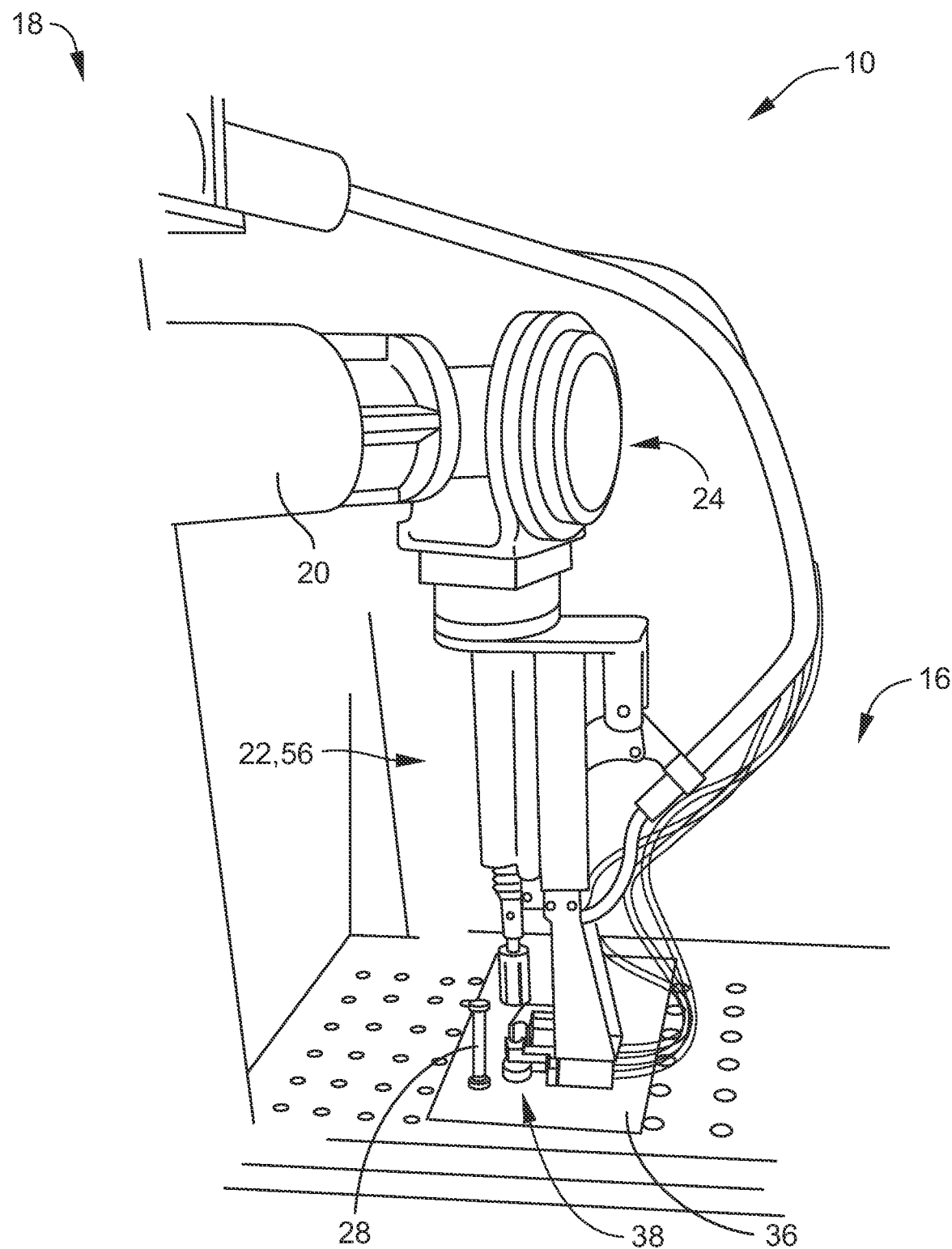
Figure 10:
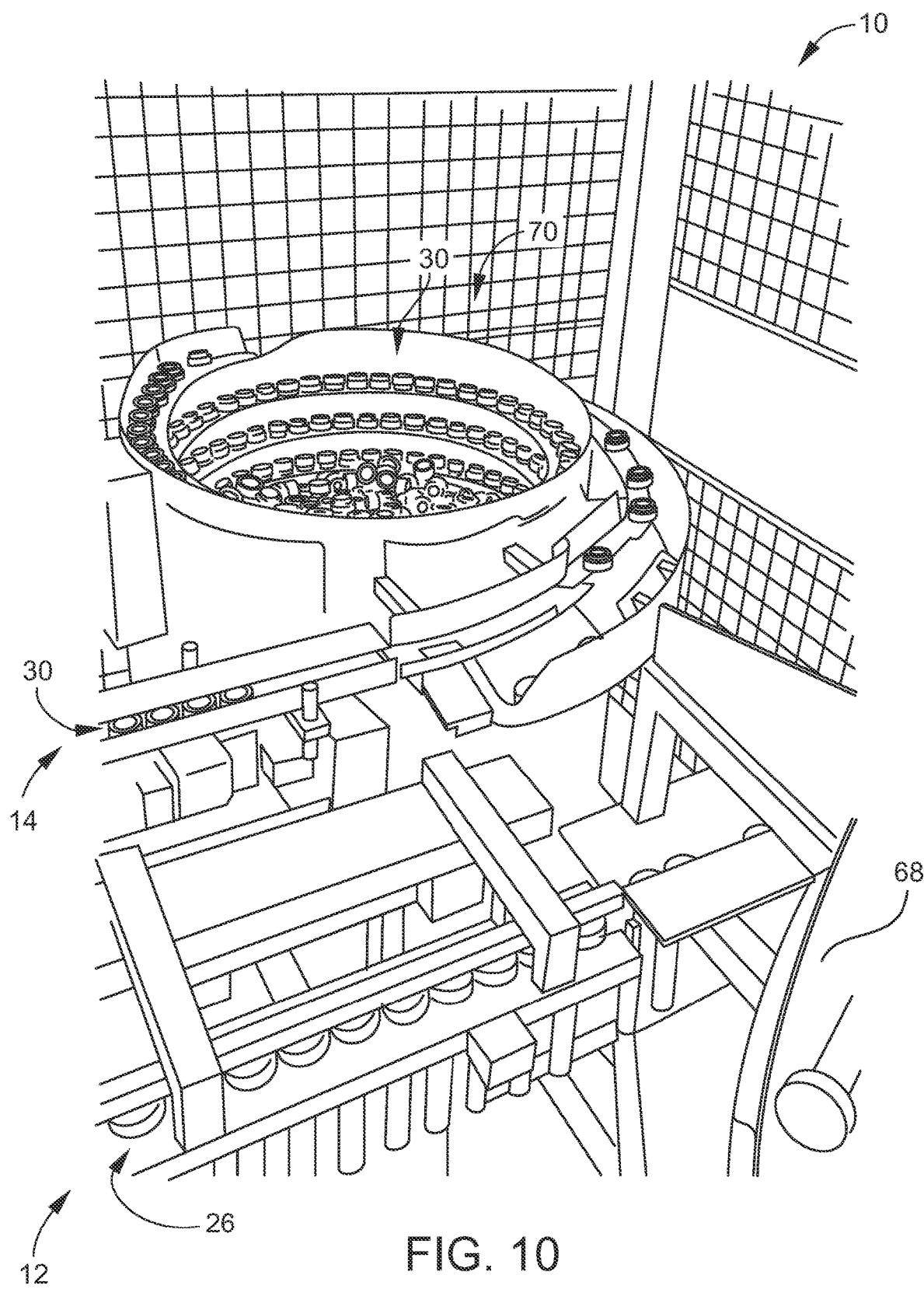
FIG. 10 shows the operation of the stud feeder and the ferrule feeder of the robotic shear stud welding system according to select embodiments of the instant disclosure.
Figure 11A:
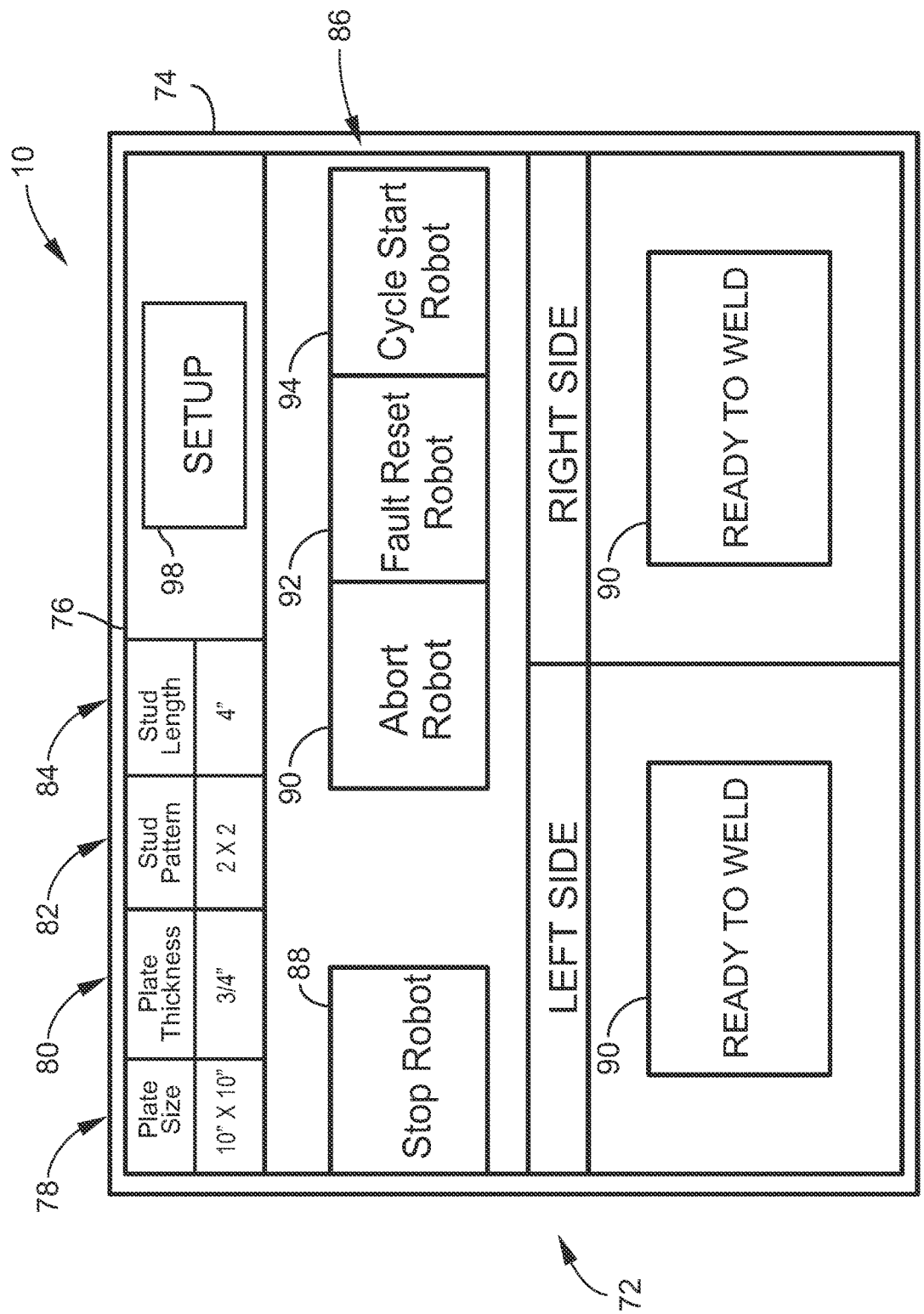
FIGS. 11A-11F show screen shots of the user input device of the control panel of the robotic shear stud welding system according to select embodiments of the instant disclosure.
Figure 11B:
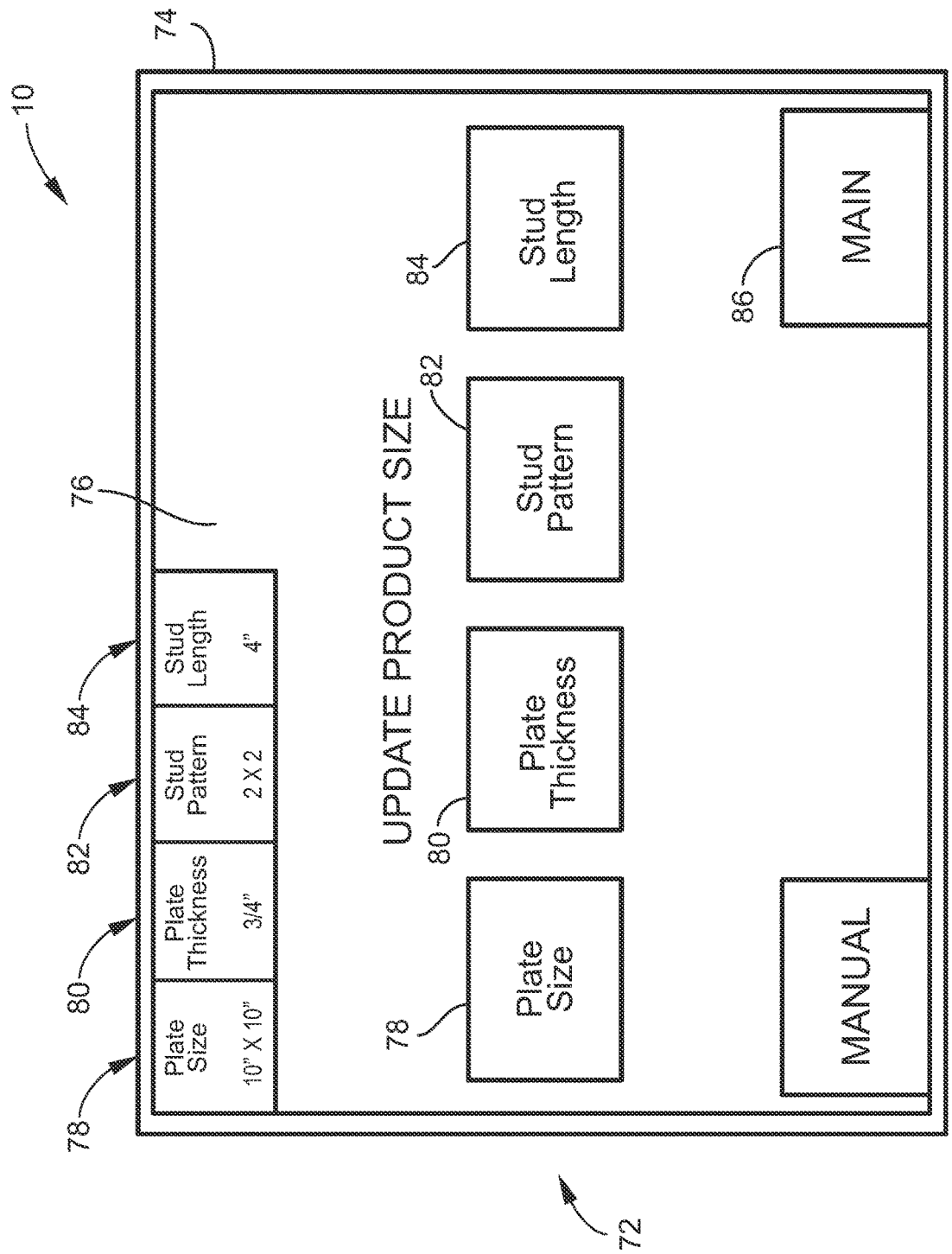
Figure 11C:
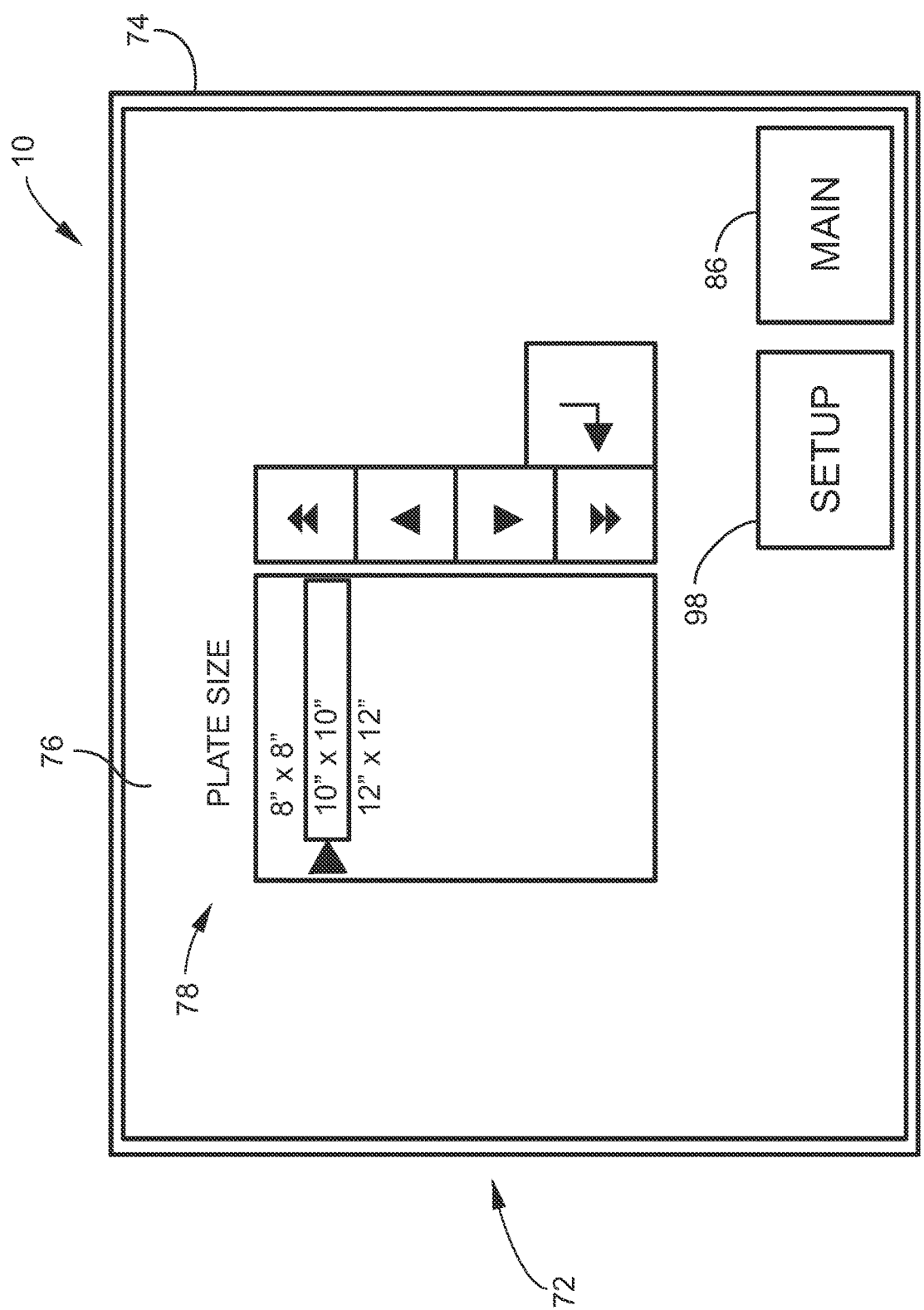
Figure 11D:
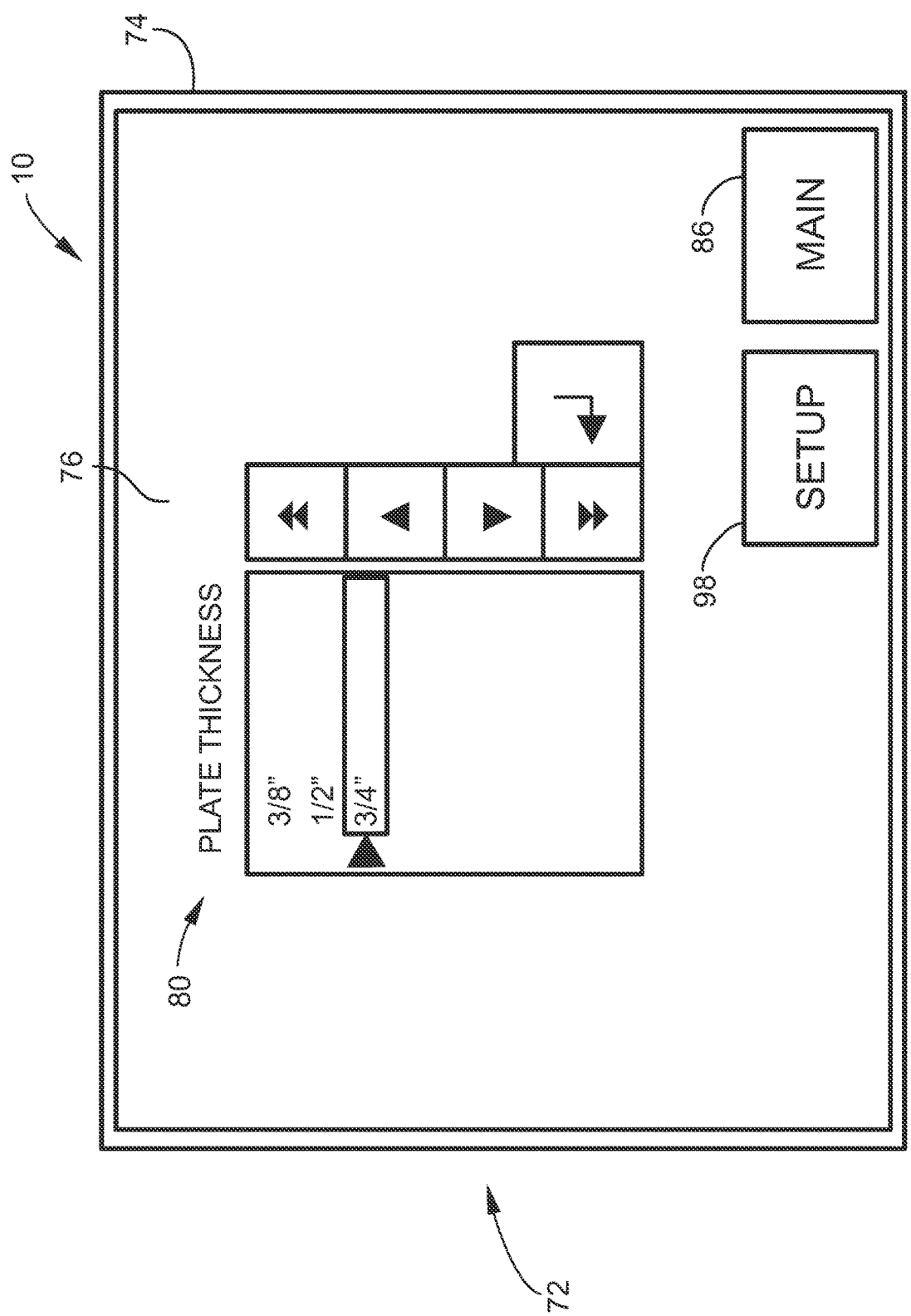
Figure 11E:
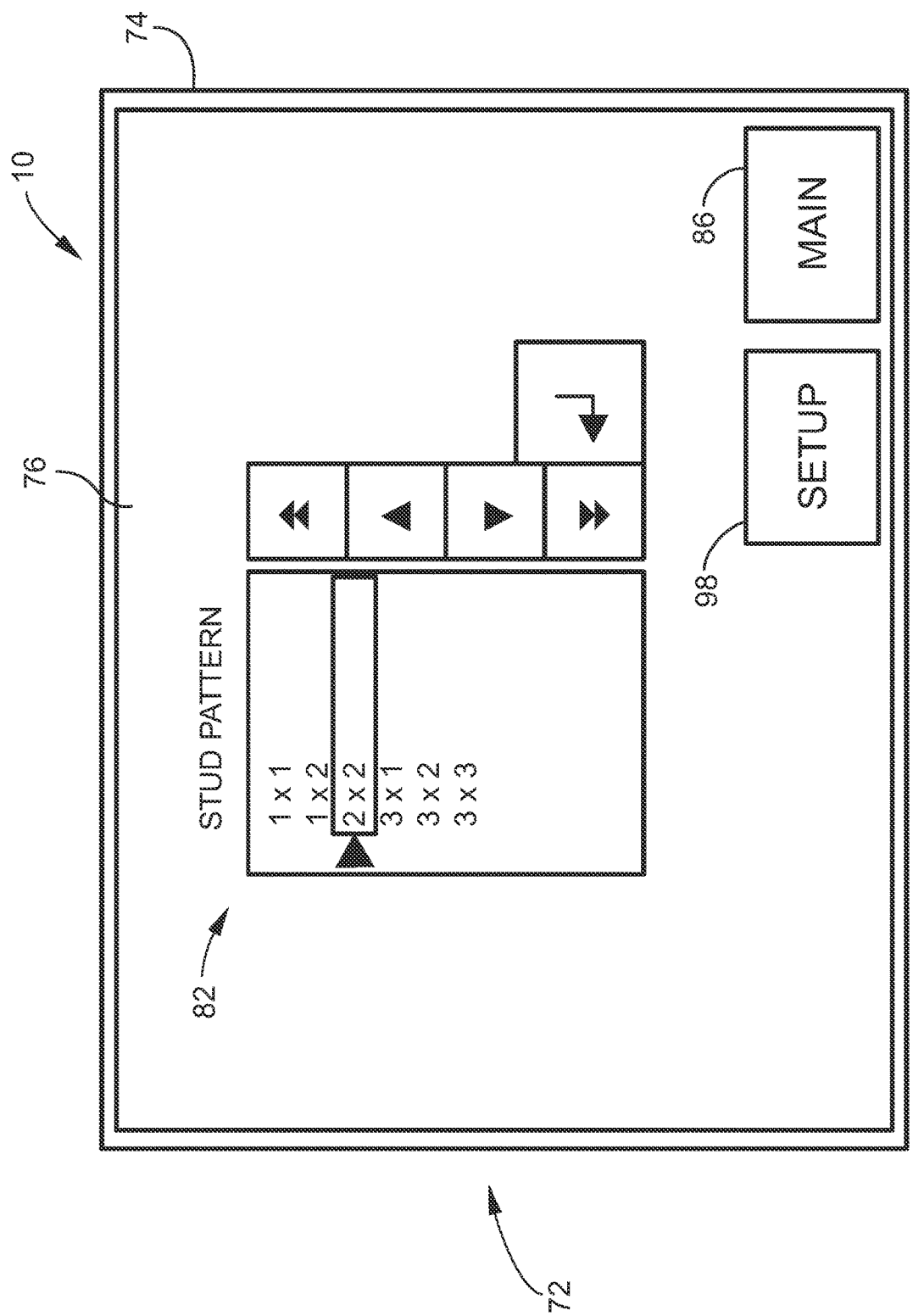
Figure 11F:
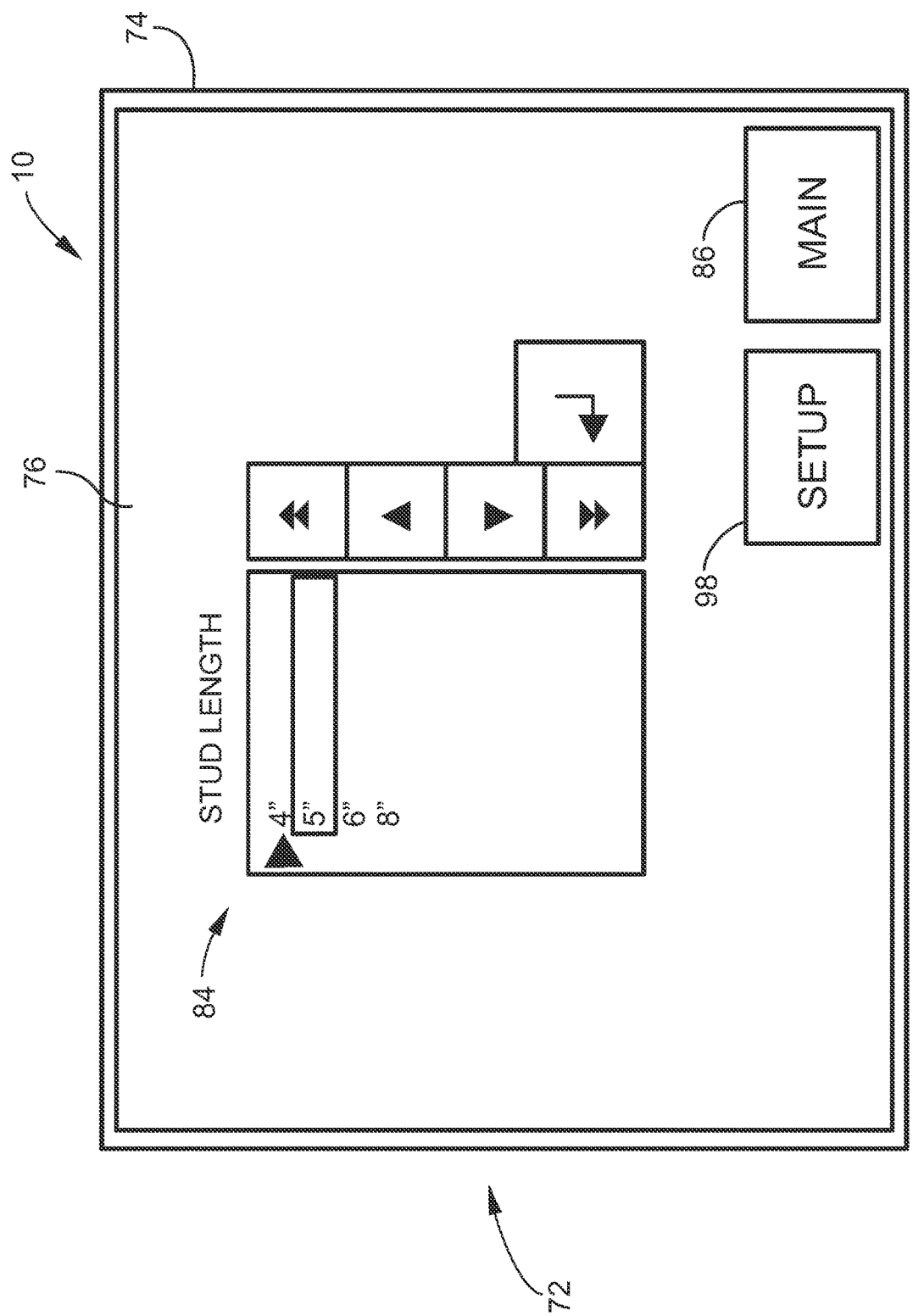

Referring specifically to FIGS. 7 and 8, one feature of robotic shear stud welding system 10 may be the inclusion of ferrule gripper 38. Ferrule gripper 38 may be configured to grip single ferrule 32 and position single ferrule 32 at bottom 34 of single stud 28. Ferrule gripper 38 may include any devices and/or mechanisms for gripping single ferrule 32 and positioning single ferrule 32 at bottom 34 of single stud 28. In select embodiments, as shown in the Figures, ferrule gripper 38 may include first side 40 and second side 44. First side 40 may have first arm 42. Second side 44 may have second arm 46. Wherein, ferrule gripper 38 may be configured to open first side 40 from second side 44 by moving first arm 42 away from second arm 46 (or vice versa), and ferrule gripper 38 may be configured to close by moving first arm 42 toward second arm 46. Wherein, when ferrule gripper 38 is closed top chamber 48 is created at top portion 50 of ferrule gripper 38 between first side 40 and second side 44 and bottom chamber 52 is created at bottom portion 54 of ferrule gripper 38 between first side 40 and second side 44. Top chamber 48 may be configured to fit around single stud 28. Bottom chamber 52 may be configured to grip single ferrule 32 and position single ferrule 32 at bottom 34 of single stud 28.

Welding gun 22 may be included with robotic shear stud welding system 10. Welding gun 22 may be configured to weld or shoot single stud 28 onto workpiece 36, like a plate, beam, the like, etc. Welding gun 22 may be any type of welding gun configured to weld or shoot single stud 28 onto workpiece 36. In select embodiments, welding gun 22 on controllable arm 20 of robot 18 may be a drawn arc welding gun 56. Drawn arc welding gun 56, may be, but is not limited to, a Nelson gun provided by Nelson Products of New Zealand or Stanley Engineered Fastening of Stanfield, NC. Robot 18 may be any robot configured for manipulating and controlling welding gun 22 between stud feeder 12, ferrule feeder 14, and work zones 16. As an example, and clearly not limited thereto, robot 18 may be a FANUC Robot M-710iC provided by FANUC America Corporation of Rochester Hills, MI.

At least one work zone 16 may be included with robotic shear stud welding system 10. Each of the work zones 16 may provide an established or consistent space for a workpiece 36 to be set on and oriented to. In select embodiments, robotic shear stud welding system 10 may include at least two of the work zones 16. The at least two work zones 16 may include first work zone 58, and a second work zone 60. Wherein, robotic shear stud welding system 10 may be configured to operate exclusively in first work zone 58 while second work zone 60 is being prepared, or work exclusively in second work zone 60 while first work zone 58 is being prepared. However, the disclosure is not so limited and any number of work zones 16 may be included. In select embodiments, first work zone 58 may include first safety light curtain 62. First safety light curtain 62 may be activated when controllable arm 20 with welding gun 22 is shooting studs in first work zone 58 and deactivated when controllable arm 20 with welding gun 22 is not shooting studs in first work zone 58, at which point, first work zone 58 can be prepared. Likewise, second work zone 60 may include second safety light curtain 64. Second safety light curtain 64 may be activated when controllable arm 20 with welding gun 22 is shooting studs in second work zone 60 and deactivated when controllable arm 20 with welding gun 22 is not shooting studs in second work zone 60, at which point, second work zone 60 can be prepared.

Another feature of robotic shear stud welding system 10 may be that each of the at least one work zones 16 may include electro magnet 66. Electro magnet 66 may be under each of the associated work zone 16, like one under first work zone 58 and another or the same under second work zone 60. Electro magnet 66 may be configured to be energized to hold workpiece 36 down after welding gun 22 shoots the stud 28 on workpiece 36 and while welding gun 22 moves away from stud 28. The use of electro magnet 66 may allow for faster processing time as it allows controllable arm 20 of robot 18 to move away from the welded stud 28 immediately after it is shot or welded.

Another feature of robotic shear stud welding system 10 may be that stud feeder 12 can include automated stud bowl feeder 68. Automated stud bowl feeder 68 may be configured to hold the plurality of studs 26 and feed the plurality of studs 26 to stud feeder 12. Automated stud bowl feeder 68 may provide a means for holding a large quantity of studs 26 and for orienting the studs in a proper alignment as it feeds each of the studs 26 to stud feeder 12.

Another feature of robotic shear stud welding system 10 may be that ferrule feeder 14 can include automated ferrule bowl feeder 70. Automated ferrule bowl feeder 70 may be configured to hold the plurality of ferrules 30 and feed the plurality of ferrules 30 to ferrule feeder 14. Automated ferrule bowl feeder 70 may provide a means for holding a large quantity of ferrules 30 and for orienting the ferrules in a proper alignment as it feeds each of the ferrules 30 to ferrule feeder 14.

Another feature of robotic shear stud welding system 10 may be the inclusion of control panel 72. Control panel 72 may be configured to control robotic shear stud welding system 10, including, but not limited to, controlling controllable arm 20 of robot 18, welding gun 22, stud feeder 12, ferrule feeder 14, and work zone 16, like electro magnet 66 of each of the work zones 16 and/or the safety light curtains (62, 64) of each of the work zones. In select embodiments, control panel 72 may include user input device 74. User input device 74 may provide a means for an operator to control and setup robotic shear stud welding system 10. User input may include, but is not limited to, having touch screen 76 configured to allow a user or operator to configure shear stud welding system 10. Referring now specifically to FIGS. 11A-11F, in select embodiments, touch screen 76 of user input device 74 may include: plate size selection 78 configured to select the size plate of workpiece 36; plate thickness selection 80 configured to select the thickness of workpiece 36; stud pattern selection 82 configured to select the pattern of the studs to be shot; and/or stud length selection 84 configured to select the length of the stud. In other select embodiments, touch screen 76 of user input device 74 may include home screen 86 (see FIG. 11A). Home screen 86 may be configured to display the selected plate size, plate thickness, stud pattern, and stud length. Home screen 86 may also be configured to provide selections for: stopping robot 88; aborting robot 90; fault reset robot 92; cycle start robot 94; and ready to weld 96 for each of the work zones 16. Home screen 86 may also include a setup selection 98 (see FIG. 11B) configured for accessing the plate size selection 78 (see FIG. 11C), the plate thickness selection 80 (see FIG. 11D), the stud pattern selection 82 (see FIG. 11E), and/or the stud length selection 84 (see FIG. 11F). Home screen 86 may also be accessed through the "MAIN" button selection in FIGS. 11B-11F.

Another feature of robotic shear stud welding system 10 may be the inclusion of safety perimeter 100 around robotic shear stud welding system 10. Safety perimeter 100 may be configured for providing a barrier around robotic shear stud welding system 10 for keeping the area safe and clean. In select embodiments, safety perimeter 100 may include opening 102 for each of the at least one work zones 16 and/or for control panel 72. In addition, at least one access door 104 may be included that are configured for accessing robot 18, ferrule feeder 14, and/or stud feeder 12. In select embodiments, safety perimeter 100 may include first access door 106 and second access door 108. First access door 1-6 may be configured for accessing ferrule feeder 14 and stud feeder 12. Second access door 108 may be configured for accessing robot 18, including controllable arm 20 and welding gun 22.

Referring now specifically to FIG. 12, in another aspect, the instant disclosure embraces automated method 200 of shooting a shear stud. Automated method 200 of shooting a shear stud may include utilizing robotic shear stud welding system 10 in any of the embodiments and/or combination of embodiments shown and/or described herein. As such, automated method 200 of shooting a shear stud may generally include step 202 of providing the disclosed robotic shear stud welding system 10 including stud feeder 12, ferrule feeder 14, at least one work zone 16, robot 18 with controllable arm 20, and welding gun 22. Wherein, with the provided robotic shear stud welding system 10, automated method 200 of shooting a shear stud may include the steps of: step 204 of picking up the single stud 28 from stud feeder 12 with welding gun 22; step 206 of picking up single ferrule 32 from ferrule feeder 14 with welding gun 22; step 208 of positioning single ferrule 32 at bottom 34 of the single stud 28 with welding gun 22; and step 210 of shooting (or welding) the single stud 28 to workpiece 36 in one of the at least one work zones 16. In select embodiments of automated method 200 of shooting a shear stud, welding gun 22 may include ferrule gripper 38 configured to grip single ferrule 32 and position single ferrule 32 at bottom 34 of single stud 28. With this included ferrule gripper 38, step 204 of picking up single stud 28 from stud feeder 12 with welding gun 22 may include step 212 of using ferrule gripper 38 on welding gun 22 to pick up single stud 28. In addition, step 206 of picking up single ferrule 32 from ferrule feeder 14 with welding gun 22 may include step 214 of using ferrule gripper 38 on welding gun 22 to pick up single stud 28. And finally, step 208 of positioning single ferrule 32 at bottom 34 of single stud 28 with welding gun 22 may include step 216 of using ferrule gripper 38 on welding gun 22 to position single ferrule 32 at bottom 34 of single stud 28.

In sum, the disclosed robotic system 10 and method 200 are configured to select a variety of plate sizes and thicknesses, then select the stud pattern and stud size to be shot. The disclosed robot 18 can then go and grab the stud from an automated bowl feeder. Then grabs a ferrell from another automated bowl feeder then goes to the plate to shoot it. After welding with an arc flash there is an electro magnet 66 under each work zone 16 of the table that becomes energized in order to hold the plate (workpiece 36) down while the welding gun 22 pulls off the stud. After the studs are shot on one plate and it moves to the other side, safety light curtain (62 or 64) is deactivated allowing the operator to reload that side while the robot is shooting the other side.

The use of the electro magnets 66 under each work zone 16 that gets energized immediately after the stud is shot so the plate (workpiece 36) gets held down when welding gun 22 is pulled off the head may be used to save time. As an example, and clearly not limited thereto, the use of the electro magnets 66 may shave off 15 seconds per plate. In addition, the control panel 72 may have a program written to it that has the ability to mirror copy the program on each side to fit within that shootable space. As another example, the plate can be duplicated for a total of nine plates per side, where the welding gun 22 may shoot all the studs on one side, when it moves away to start other side the light curtains (62, 64) disengage allowing the operator to reload the plates for the next round. The program is like a food menu. You first select plate thickness, then select plate shape, then stud placements and finally stud length. The program puts it all together and makes proper adjustments. As an example, for ½" diameter studs, system 10 could shoot from a 4" long stud up to an 8" long ½" stud. The left side could be duplicated with the same set up put on the right side for ¾" just mirror copied. Even more time could be picked up if the placement of the pick up points of the studs and ferrules located right behind the table towards the middle were redesigned closer.

In addition, system 10 could be designed to pick up the ½" studs and expanded to do the ¾" studs. This will require the robot to park the ½ head and grab the ¾ head. Due to the head size being different on those two studs the change out time on the stud gun would have had to be done manually so complete head swap makes more sense.

Furthermore, the present disclosure of robotic shear stud welding system 10 embraces incorporating the system into a plate machine as an option. That would create an even more efficient system. The disclosed system 10 would already have the measuring systems in place, and the burning systems are there, so it would really just come down to integration.

Finally, with some redesign, the present disclosure of robotic shear stud welding system embraces the bowl feeders (12/68 and 14/70) can be set up on a traveling carriage quite easily. With this setup, a column, beam or bridge girder with hundreds of studs could be automated with the robotic arm just going non stop.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A robotic shear stud welding system comprising:
   a stud feeder configured to hold a plurality of studs and feed a single stud therefrom;
   a ferrule feeder configured to hold a plurality of ferrules and feed a single ferrule therefrom;
   at least one work zone;
   a robot with a controllable arm, the controllable arm is configured to accurately move between the stud feeder, the ferrule feeder, and each of the at least one work zones; and
   a welding gun attached to a distal end of the controllable arm, the welding gun attached to the distal end of the controllable arm of the robot is configured to pick up the single stud from the stud feeder, pick up the single ferrule from the ferrule feeder and position the single ferrule at a bottom of the single stud, and shoot the single stud to a workpiece in one of the at least one work zones;

wherein the welding gun including a ferrule gripper configured to grip the ferrule and position the ferrule at the bottom of the single stud, wherein the ferrule gripper including:

a first side with a first arm; and a second side with a second arm;

wherein, the ferrule gripper is configured to open the first side from the second side by moving the first arm away from the second arm, and the ferrule gripper is configured to close by moving the first arm toward the second arm; and wherein, when the ferrule gripper is closed a top chamber is created at a top portion of the ferrule gripper between the first side and the second side and a bottom chamber is created at a bottom portion of the ferrule gripper between the first side and the second side, where the top chamber is configured to fit around the single stud and the bottom chamber is configured to grip the single ferrule and position the single ferrule at the bottom of the single stud.

2. The robotic shear stud welding system of claim 1, wherein the welding gun on the controllable arm is a drawn arc welding gun.

3. The robotic shear stud welding system of claim 1 including at least two of the work zones, the at least two work zones including:

a first work zone; and a second work zone;

wherein, the robotic shear stud welding system is configured to operate exclusively in the first work zone while the second work zone is being prepared, or work exclusively in the second work zone while the first work zone is being prepared.

4. The robotic shear stud welding system of claim 3, wherein:

the first work zone including a first safety light curtain that is activated when the controllable arm is shooting studs in the first work zone and deactivated when the controllable arm is not shooting studs in the first work zone whereby the first work zone can be prepared; and the second work zone including a second safety light curtain that is activated when the controllable arm is shooting studs in the second work zone and deactivated when the controllable arm is not shooting studs in the second work zone whereby the second work zone can be prepared.

5. The robotic shear stud welding system of claim 1, wherein each of the at least one work zones including an electro magnet under the work zone, the electro magnet is configured to be energized to hold the workpiece down after the welding gun shoots the single stud on the workpiece and while the welding gun moves away from the single stud.

6. The robotic shear stud welding system of claim 1, wherein:

the stud feeder including an automated stud bowl feeder configured to hold the plurality of studs and feed the plurality of studs to the stud feeder; and the ferrule feeder including an automated ferrule bowl feeder configured to hold the plurality of ferrules and feed the plurality of ferrules to the ferrule feeder.

7. The robotic shear stud welding system of claim 1 further comprising a control panel configured to control the robotic shear stud welding system including controlling the controllable arm of the robot, the welding gun, the stud feeder, the ferrule feeder, and the at least one work zone.

8. The robotic shear stud welding system of claim 7, wherein the control panel including a user input device with a touch screen configured to allow a user to configure the robotic shear stud welding system.

9. The robotic shear stud welding system of claim 8, wherein the user input device including:

a plate size selection configured to select a size plate of the workpiece;

a plate thickness selection configured to select a thickness of the workpiece;

a stud pattern selection configured to select a pattern of the studs to be shot;

a stud length selection configured to select a length of the studs; or combinations thereof.

10. The robotic shear stud welding system of claim 9, wherein the user input device including:

the plate size selection configured to select the size plate of the workpiece;

the plate thickness selection configured to select the thickness of the workpiece;

the stud patter selection configured to select the pattern of the studs to be shot; and the stud length selection configured to select the length of the studs.

11. The robotic shear stud welding system of claim 10, wherein the user input device including a home screen configured to display the selected plate size, plate thickness, stud pattern, and stud length, and to provide selections for:

a setup a stopping robot;

an aborting robot;

a fault reset robot;

a cycle start robot; and a ready to weld for each of the work zones.

12. The robotic shear stud welding system of claim 1 further including a safety perimeter around the robotic shear stud welding system.

13. The robotic shear stud welding system of claim 12, wherein the safety perimeter including:

an opening for each of the at least one work zones and a control panel; and at least one access door configured for accessing the robot, the ferrule feeder, and the stud feeder.

14. The robotic shear stud welding system of claim 13, wherein the safety perimeter including:

a first access door configured for accessing the ferrule feeder and the stud feeder; and a second access door configured for accessing the robot.

15. A ferrule gripper for a shear stud welding gun comprising:

a first side with a first arm; and a second side with a second arm;

the ferrule gripper is configured to open the first side from the second side by moving the first arm away from the second arm, and the ferrule gripper is configured to close the first side from the second side by moving the first arm toward the second arm; and wherein, when the ferrule gripper is closed a top chamber is created at a top portion of the ferrule gripper between the first side and the second side and a bottom chamber is created at a bottom portion of the ferrule gripper between the first side and the second side, where the top chamber is configured to fit around a single stud, and the bottom chamber is configured to grip a single ferrule and position the single ferrule at the bottom of the single stud.

16. An automated method of shooting a shear stud comprising:
providing a robotic shear stud welding system comprising:
a stud feeder configured to hold a plurality of studs and feed a single stud therefrom;
a ferrule feeder configured to hold a plurality of ferrules and feed a single ferrule therefrom;
at least one work zone;
a robot with a controllable arm, the controllable arm is configured to accurately move between the stud feeder, the ferrule feeder, and each of the at least one work zones; and
a welding gun attached to a distal end of the controllable arm, the welding gun including a ferrule gripper configured to grip the single ferrule and position the single ferrule at the bottom of the single stud;
picking up the single stud from the stud feeder with the welding gun including using the ferrule gripper on the welding gun to pick up the single stud;
picking up the single ferrule from the ferrule feeder with the welding gun including using the ferrule gripper on the welding gun to pick up the single stud;
positioning the single ferrule at a bottom of the single stud with the welding gun including using the ferrule gripper on the welding gun to position the single ferrule at the bottom of the single stud; and
shooting the single stud to a workpiece in one of the at least one work zones.

17. A robotic shear stud welding system comprising:
a stud feeder configured to hold a plurality of studs and feed a single stud therefrom;
a ferrule feeder configured to hold a plurality of ferrules and feed a single ferrule therefrom;
at least two work zones, the at least two work zones including:
a first work zone; and
a second work zone;
wherein, the robotic shear stud welding system is configured to operate exclusively in the first work zone while the second work zone is being prepared, or work exclusively in the second work zone while the first work zone is being prepared;
a robot with a controllable arm, the controllable arm is configured to accurately move between the stud feeder, the ferrule feeder, and each of the at least two work zones;
a welding gun attached to a distal end of the controllable arm, the welding gun attached to the distal end of the controllable arm of the robot is configured to pick up the single stud from the stud feeder, pick up the single ferrule from the ferrule feeder and position the single ferrule at a bottom of the single stud, and shoot the single stud to a workpiece in one of the at least two work zones;
wherein:
the first work zone including a first safety light curtain that is activated when the controllable arm is shooting studs in the first work zone and deactivated when the controllable arm is not shooting studs in the first work zone whereby the first work zone can be prepared; and
the second work zone including a second safety light curtain that is activated when the controllable arm is shooting studs in the second work zone and deactivated when the controllable arm is not shooting studs in the second work zone whereby the second work zone can be prepared.

18. A robotic shear stud welding system comprising:
a stud feeder configured to hold a plurality of studs and feed a single stud therefrom;
a ferrule feeder configured to hold a plurality of ferrules and feed a single ferrule therefrom;
at least one work zone;
a robot with a controllable arm, the controllable arm is configured to accurately move between the stud feeder, the ferrule feeder, and each of the at least one work zones;
a welding gun attached to a distal end of the controllable arm, the welding gun attached to the distal end of the controllable arm of the robot is configured to pick up the single stud from the stud feeder, pick up the single ferrule from the ferrule feeder and position the single ferrule at a bottom of the single stud, and shoot the single stud to a workpiece in one of the at least one work zones;
wherein each of the at least one work zones including an electro magnet under the work zone, the electro magnet is configured to be energized to hold the workpiece down after the welding gun shoots the single stud on the workpiece and while the welding gun moves away from the single stud.

19. A robotic shear stud welding system comprising:
a stud feeder configured to hold a plurality of studs and feed a single stud therefrom;
a ferrule feeder configured to hold a plurality of ferrules and feed a single ferrule therefrom;
at least one work zone;
a robot with a controllable arm, the controllable arm is configured to accurately move between the stud feeder, the ferrule feeder, and each of the at least one work zones;
a welding gun attached to a distal end of the controllable arm, the welding gun attached to the distal end of the controllable arm of the robot is configured to pick up the single stud from the stud feeder, pick up the single ferrule from the ferrule feeder and position the single ferrule at a bottom of the single stud, and shoot the single stud to a workpiece in one of the at least one work zones; and
a control panel configured to control the robotic shear stud welding system including controlling the controllable arm of the robot, the welding gun, the stud feeder, the ferrule feeder, and the at least one work zone, wherein the control panel including a user input device with a touch screen configured to allow a user to configure the robotic shear stud welding system.

* * * * *